(12) United States Patent
Beaumont

(10) Patent No.: US 10,671,414 B2
(45) Date of Patent: Jun. 2, 2020

(54) CROSS DOMAIN DESKTOP COMPOSITOR

(71) Applicant: The Commonwealth of Australia, Edinburgh (AU)

(72) Inventor: Mark Robert Beaumont, Edinburgh (AU)

(73) Assignee: THE COMMONWEALTH OF AUSTRALIA, Edinburgh (AU)

(*) Notice: Subject to any disclaimer, the term of this patent is extended or adjusted under 35 U.S.C. 154(b) by 0 days.

(21) Appl. No.: 15/572,452

(22) PCT Filed: May 11, 2016

(86) PCT No.: PCT/AU2016/000160
§ 371 (c)(1),
(2) Date: Nov. 7, 2017

(87) PCT Pub. No.: WO2016/179635
PCT Pub. Date: Nov. 17, 2016

(65) Prior Publication Data
US 2018/0113719 A1    Apr. 26, 2018

(30) Foreign Application Priority Data
May 11, 2015   (AU) ................................ 2015901708

(51) Int. Cl.
*G06F 3/0481* (2013.01)
*G06F 9/451* (2018.01)
(Continued)

(52) U.S. Cl.
CPC .............. *G06F 9/451* (2018.02); *G06F 3/023* (2013.01); *G06F 3/0481* (2013.01); *G06F 21/84* (2013.01);
(Continued)

(58) Field of Classification Search
CPC   G06Q 10/067; G06F 8/20; G06F 9/44; G06F 17/30; G06F 21/84; G06F 3/0481;
(Continued)

(56) References Cited

U.S. PATENT DOCUMENTS 7,953,713 B2 * 5/2011 Neogi ..................... G06F 9/542
                                                     707/694
8,584,211 B1   11/2013 Vetter et al.
(Continued)

OTHER PUBLICATIONS

International Preliminary Report on Patentability dated Sep. 12, 2017 for International Application No. PCT/AU2016/000160 filed on May 11, 2016.
(Continued)

*Primary Examiner* — Steven P Sax
(74) *Attorney, Agent, or Firm* — Westman, Champlin & Koehler, P.A.

(57) ABSTRACT

Disclosed is a Cross Domain Desktop Compositor (CDDC) that allows separate graphical user interfaces (GUIs) from independent computing domains to be combined and accessed from a single physical use interface. The CDDC provides a unified desktop experience, whilst preventing data leakage between isolated domains, compositing application windows from each separate GUI and providing natural keyboard and mouse interaction with every displayed window.

34 Claims, 23 Drawing Sheets

(51) Int. Cl.
    *G06F 21/84*     (2013.01)
    *G06F 3/023*     (2006.01)
    *G09G 5/08*     (2006.01)
    *G06F 1/18*     (2006.01)
    *G06F 3/02*     (2006.01)

(52) U.S. Cl.
    CPC .............. *G09G 5/08* (2013.01); *G06F 1/181* (2013.01); *G06F 3/0227* (2013.01); *G06F 2221/2113* (2013.01); *G09G 2354/00* (2013.01)

(58) Field of Classification Search
    CPC ........ G06F 3/023; G06F 3/0227; G06F 1/181; G09G 5/08
    See application file for complete search history.

(56) References Cited

U.S. PATENT DOCUMENTS

| | | | |
|---|---|---|---|
| 8,589,333 | B2 | 11/2013 | Patten et al. |
| 8,769,172 | B2 | 7/2014 | Soifer et al. |
| 9,077,578 | B1* | 7/2015 | Kizhepat ............... H04N 19/48 |
| 2003/0005445 | A1* | 1/2003 | Schein ............... H04N 5/44543 725/51 |
| 2007/0018992 | A1 | 1/2007 | Wong |
| 2007/0094344 | A1* | 4/2007 | Miriyala ............. H04L 41/0206 709/216 |
| 2007/0261100 | A1* | 11/2007 | Greeson .................. G06F 21/32 726/1 |
| 2008/0098348 | A1* | 4/2008 | Olson ....................... G06F 8/20 717/104 |
| 2009/0077503 | A1* | 3/2009 | Sundstrom .......... G06F 3/04842 715/856 |
| 2009/0144421 | A1* | 6/2009 | Bunch .................. H04L 43/045 709/224 |
| 2009/0210482 | A1* | 8/2009 | Wynn ................. G06F 9/44526 709/203 |
| 2010/0153865 | A1* | 6/2010 | Barnes ................. G06F 3/0484 715/762 |
| 2014/0101782 | A1 | 4/2014 | Beaumont et al. |
| 2014/0278623 | A1* | 9/2014 | Martinez ................ G06Q 10/06 705/7.12 |
| 2014/0282050 | A1 | 9/2014 | Quinn et al. |
| 2015/0113526 | A1* | 4/2015 | Baboval ............. G06F 9/45533 718/1 |
| 2015/0188927 | A1* | 7/2015 | Santhi ................... H04L 63/104 726/4 |
| 2016/0231869 | A1* | 8/2016 | Kumar .................. G06F 3/0481 |
| 2016/0246560 | A1* | 8/2016 | Petrov .................. G06F 3/1438 |
| 2016/0284105 | A1* | 9/2016 | Dawood ..................... G06T 9/00 |
| 2018/0121172 | A1* | 5/2018 | Marney .................. G06Q 10/06 |

OTHER PUBLICATIONS

International Search Report dated Jul. 15, 2016 for International Application No. PCT/AU2016/000160 filed on May 11, 2016.
Kamis, G., SELinux Symposium Case Study—US Coast Guard NetTop2—Thin Client Implementation, Mar. 15, 2007.
Lynch, S., Enabling Secure Information Sharing Across All Government, IBM Corporation, Feb. 20, 2013.
Written Opinion dated Jul. 15, 2016 for International Application No. PCT/AU2016/000160 filed on May 11, 2016.
Written Opinion dated Apr. 4, 2017 for International Application No. PCT/AU2016/000160 filed on May 11, 2016.

* cited by examiner

CROSS DOMAIN DESKTOP COMPOSITOR

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. § 371 of prior PCT International Application No. PCT/AU2016/000160 which has an International Filing Date of May 11, 2016, which designates the United States of America, and which claims priority to Australian Application No. 2015901708 filed May 11, 2015. Each of the aforementioned applications is incorporated by reference herein in its entirety, and each is hereby expressly made a part of this specification.

PRIORITY DOCUMENTS

The present application claims priority from Australian Provisional Patent Application No. 2015901708 titled "CROSS DOMAIN DESKTOP COMPOSITOR." and filed on 11 May 2015, the content of which is hereby incorporated by reference in its entirety.

FIELD

The field of the disclosure is the multi-level secure (MLS) computing environment and in particular the security of user interfaces within the environment, when one screen, keyboard and pointing device is used to view and interact with multiple computing domains, in an integrated fashion, while preserving the underlying isolation of the domains.

BACKGROUND

A user desirous of using two computers which are part of independent domains has in most cases in the past, used them separately by having to use one set of monitor 4, keyboard 6 and pointing device 5 (such as a mouse for each computer 2 (see FIGS. 1 and 2 and the respective discussion later in the specification).

A multi-level secure user interface is a system, method or device that facilitates access to multiple independent computer domains (e.g., independent physical computers, or independent computer networks) from a single user interface.

The security of a multi-level secure user interface is an issue which is sometimes underestimated or dismissed in favour of the convenience and efficiency of a user being able to view all the domains at the same time and to achieve this convenience a user can use a switching arrangement to allow the user to use the same peripheral inputs such as keyboard and pointing device while using a single monitor to view and enable interaction with all the available domains. This arrangement is however often not intended to keep the domains isolated from one another. This can be a serious issue if the domains are independent and isolated fix a reason.

One prior arrangement for providing this functionality is to provide a Keyboard Video Mouse (KVM) switch 33 that is configured to connect a single keyboard 6, monitor 4, and pointing device 5 such as a mouse to a selected computer of multiple computers 2a 2b that may be part of respective separate domains (see FIG. 3 and respective discussion later in the specification). The KVM switch 33 permits sending keyboard signals to one computer and displaying the video from that same computer while also sending mouse generated signals to the selected computer which are then transformed into the cursor movements displayed on the single monitor 4. It is also possible in some KVM switches for the selected computer to be viewed and accessed but still allow the single monitor to view the output from another of the computers.

There is a possibility that data from one domain can be surreptitiously sent to another domain due to hardware and software elements in the switch and/or there is also a possibility that without adequate electromagnetic isolation, data passing through one switch circuit can be detected by unused portions of the switch circuit still connected to a host computer and then leaked to another domain. There are multiple further ways in which data can be collected and sent to another domain without the knowledge of the user.

A Secured KVM, such as those depicted in FIGS. 4 and 5 and in U.S. Pat. No. 8,769,172 physically enforces unidirectional flows between the keyboard 6 and mouse 5 and any one of a number of attached host computers 2a 2b thereby preventing data leakage between domains. The components controlling the switching of the keyboard and mouse input to the correct host computer and the components enforcing the unidirectional data flow are trusted and designed to some extent to be trustworthy. The prior art as depicted in FIG. 1 also displays a prior art secured KVM. The Secured KVM presents the Graphical User Interface (GUI), or video display output from each of host computer in a number of manners. A first manner is where the host computer currently connected to the keyboard and mouse has its video output consume the whole display (a dominant fashion), a second and third manner allow the video outputs from the separate domains to be either tiled, or cascaded on the screen. In these manners interacting with each domain occurs through a separate GUI presented on the screen (either dominantly, or in a tiled, or cascaded fashion). A user can select which GUI to interact with using the pointing device, however interaction is strictly with one domain at a time. FIG. 6 depicts a yet further representation of the display provided by a prior art arrangement where the individual windows are displayed separately.

Existing arrangements deal with the problem of an efficient and convenient multi-level secure user interface. These implementations use a system which virtualises access to desktops. Examples of such systems include: AFRL's SecureView that runs multiple environments in logically isolated Virtual Machines (VMs) and provides secure software based compositing of different level windows; C4 Systems TVE, which runs multiple VMs the same computer and allows access to all the VMs through the same desktop, a slightly coarser granularity than SecureView; and Raytheon's Trusted Thin Client which utilises a customised Centos operating environment to support the delivery of remote desktops front multiple domains, across a single wire that connects back to a distribution console.

The described solutions provide a software-based interface. Increasingly the trusted element in these solutions is a hypervisor, e.g. Xen, a medium sized kernel of code that executes below the operating system and can be used to support virtualised domains. Often a small secure domain will contain additional code to further support the multi-level secure solution functionality. Some examples include Qubes OS, TrustGraph, and the previously mentioned SecureView. In mobile environments, hypervisors are being employed in a more simplistic manner to protect subsets of functionality, in this instance, just ensuring certain portions of a display are quarantined for use by a certain domain.

The described solutions all have a software trusted computing base and also assume for a large part that the underlying hardware mechanisms can be utilised and are also unconditionally trusted. Three issues with the software trusted computing base arise: one, the size of the code is often too large and unwieldy to formally reason about and hence guarantee its trustworthiness; two, the software is vulnerable to many different, well known attacks. This results in the software being utilised to enable data leakage between otherwise isolated domains; and three, the software-based solutions do not maintain physical isolation between independent domains, relying solely on a logical separation, enforced by the software. Even in the case where the software components perform flawlessly a fault in underlying hardware opens the opportunity for inadvertent release of sensitive data between isolated domains.

Operation of more than one domain from a single monitor in an arrangement which integrates and unifies multiple desktop elements from different domains into a single user interface using a single keyboard and single pointing device is very desirable for convenience and efficiency reasons but heretofore not readily possible while maintaining both a high level of isolation and security.

SUMMARY

In an aspect an arrangement is described which securely combines individual graphical components from each of the host computers to form a single, unified GUI through which a user can interact with all host computers/domains, there is no notion of a separate GUI being presented for each separate host computer/domain. A solution that combines host computer graphical information in this manner provides a more convenient, productive and cognitively sophisticated interface with which to interact. The present arrangement also maintains hardware-enforced isolation between domains to prevent any data leakage.

The disclosure provides a convenient unification of access to multiple isolated domains whilst maintaining a high level of security. In a preferred embodiment this security is provided by a pure hardware-based solution implementing the secure combination of the interfaces for multiple host computers.

This summary of aspects of the disclosure is provided to introduce a selection of concepts in a simplified form that are further described below in the Detailed Description of Embodiments. This summary is not intended to identify key features or essential features of the claimed subject matter, nor is it intended to be used as an aid in determining the scope of the claimed subject matter.

Some embodiments relate to apparatus and methods for controlling access from a single console of keyboard, monitor and peripheral to multiple computers or computer domains, while preventing data leakage between the computers or domains.

In a broad aspect of an embodiment there is a Cross Domain Desktop Compositor (CDDC), a digital data compositor arrangement for processing data from at least two independent domains providing respective digital display data as outputs from a digital display interface. The digital display data being associated with a program operating on the domain, typically associated with a desktop computing environment, comprises:

a digital display data input for receiving digital display data from a first independent domain having a data diode function to isolate the input from the domains not received;

a further digital display data input for receiving digital display data from a further independent domain having a data diode function to isolate the input from the domains not received; and a trusted digital display data device to identify a predetermined portion of the digital display data of each independent domain, associate a predetermined display characteristics with each identified predetermined portion, and composite the identified predetermined portion of the digital display data and associated predetermined display characteristics for all independent domains into one digital display data output, and make the digital display data output available wherein the digital display data output is adapted for display on a digital data display device.

In a further aspect the trusted digital display data device has a peripheral interface for receiving peripheral device data input, indicating use of a peripheral by a user, and a separate peripheral interface for each of the independent domains for transmitting peripheral device data output to each of the domains.

In a further aspect the trusted digital display data device is responsive to received peripheral device data input, and wherein only one domain is responsive to and receives the same peripheral device data input.

In a further aspect there is provided a secure digital display data compositor apparatus for simultaneous display of different classes of display data, each class of display data corresponding to a unique independent domain, comprising:

a plurality of digital display data input interfaces for receiving digital display data, each interface coupled to the digital display data output interface from a single independent computing domain;

a digital display data compositor, that is configured to:
identify predetermined regions of the digital display data for each independent computing domain;
define an ordering on the predetermined regions;
associate a predetermined display characteristic with each identified region; and
generate composites according to the associated display characteristics from each of the independent computing domains into a single digital display data set; and a digital display data output interface for outputting the composited digital display data.

It should be noted that the order of any steps disclosed in exemplary processes may be altered within the scope of the disclosure.

In an aspect of an embodiment there is provided a method for secure digital display data composition by a digital display data compositor to allow simultaneous display of different classes of display data, each class of display data corresponding to a unique independent computing domain, the method comprising:

receiving, by a digital display data compositor, a plurality of digital display data via a plurality of digital data input interfaces, each interface coupled to the digital display data output interface from a single independent computing domain;

identifying predetermined regions of the digital display data for each independent computing domain;

defining an ordering on the predetermined regions;

associating a predetermined display characteristic with each identified region; and compositing, according to the defined ordering, the identified regions and associated display characteristics from each of the independent computing domains into a single digital display data set, and outputting, by the digital display data compositor, the composited digital display data set on a digital display data output interface.

Details concerning computers, computer networking, software programming, telecommunications and the like may at times not be specifically illustrated as such were not considered necessary to obtain a complete understanding nor to limit a person skilled in the art in performing the embodiments, are considered present nevertheless as such are considered to be within the skills of persons of ordinary skill in the art.

A detailed description of one or more preferred embodiments is provided below along with accompanying figures that illustrate by way of example broad principles. While broad aspects are described in connection with such embodiments, it should be understood that those broad aspects are not limited to any embodiment. On the contrary, the scope of the disclosure is limited only by the appended claims and those broad aspects encompass numerous alternatives, modifications, and equivalents. For the purpose of example, numerous specific details are set forth in the following description in order to provide a thorough understanding of the present disclosure. The present disclosure may be practiced according to the claims without some or all of these specific details. For the purpose of clarity, technical material that is known in the technical fields related to the field has not been described in detail so that the present broad aspects are not unnecessarily obscured.

Although the foregoing is been described in some detail for purposes of clarity of understanding, it will be apparent that certain changes and modifications may be practiced within the scope of the appended claims as may be amended at times. It should be noted that there are many alternative ways of implementing both the disclosed process and apparatus. Accordingly, the present embodiments are to be considered as illustrative and not restrictive, and those broad aspects are not to be limited to the details given herein, but may be modified within the scope and equivalents of the appended claims as may be amended at times.

Throughout this, specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as an acknowledgment or any form of suggestion that such background or prior art forms part of the common general knowledge.

The description may use the phrase "in an embodiment", "in one or more embodiments", which may refer to one or more of the same or different embodiments.

"Logic," as used, here in, includes but is not limited to hardware, firmware, software, and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programs are logic device. Logic may also be fully embodied as software.

"Software," as used here in, includes but is not limited to 1 or more computer readable and/or executable instructions that cause a computer or other electronic device to perform functions, actions, and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skilled in the art that the form of software is dependent on, for example, requirements of a desired application, the environment it runs on, and/or the desires of a designer/programmer or the like.

Computer software can exist in a non-transitory state within a computer-readable medium of computer-readable storage medium. It is the existence of the software in this non-transitory state which allows a computer to operate in accordance with the instructions contained therein.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present broad aspects.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs) processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

DETAILED DESCRIPTION OF EMBODIMENTS

Definitions

Figure 1:
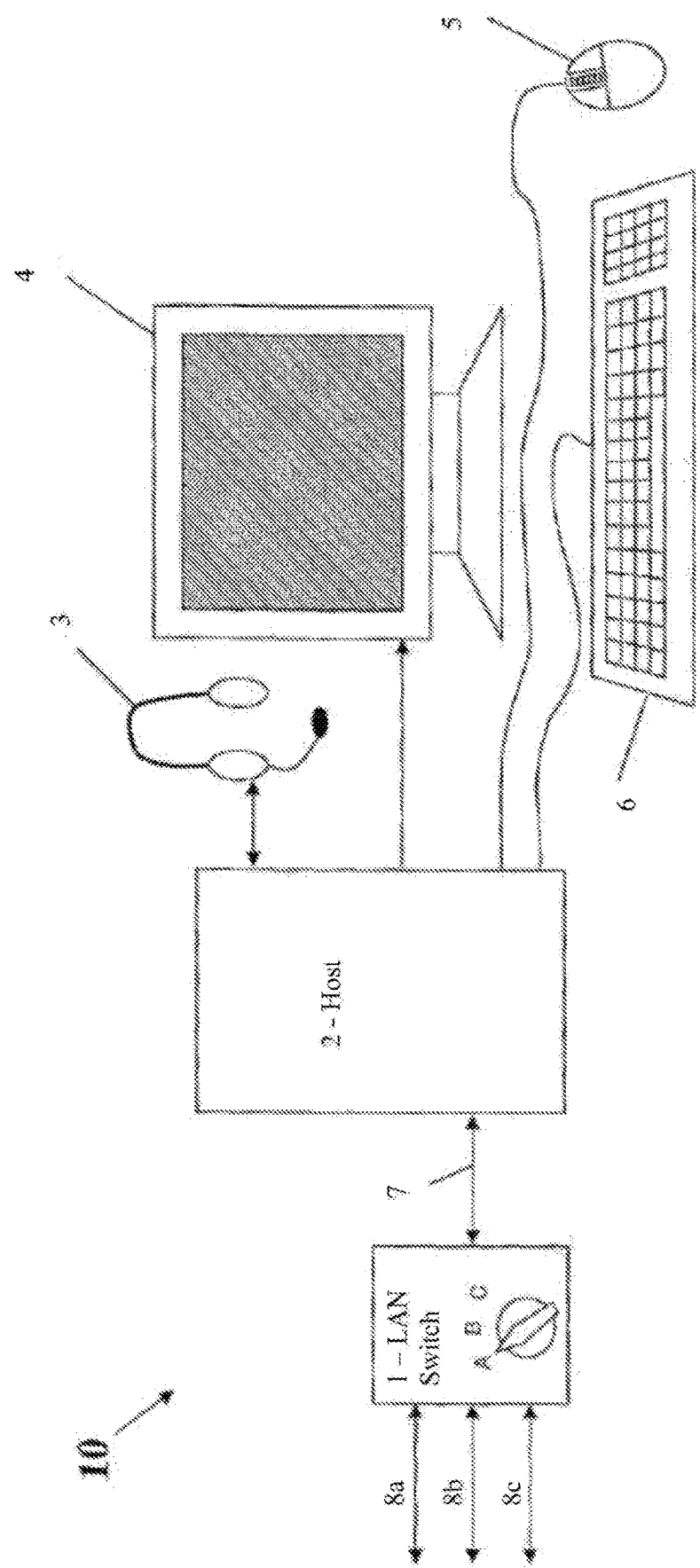
FIG. 1 depicts a prior art of physically switch networks.

The words trusted and trustworthy have specific meaning in the field. A system that is trustworthy is a system that can be verified to operate correctly; it represents a secure, available, and reliable system or component that will not fail, where failure is the inability to enforce specific, known security properties. A trusted system is a critical component that is relied upon for security, specifically if a trusted component fails then the security properties of the system will also be broken.

By way of explanation a domain is commonly understood to be representative of a group of computers and digital devices communicating with each other and interacting according to shared predetermined rules and procedures. Computers and digital devices that do not share those predetermined rules and procedures cannot interact with the computers and digital devices of another domain. However, they can be permitted to interact by temporally adopting the shared predetermined rules and procedures of a selected domain.

One or more applications/programs can be operated at the same time on one or more computers and if one of those computers is a server, it makes those one or more applications/programs available to one or more computers but only if those other computers are within the same domain. One computer may operate one or more instances of the application/program and two or more computers can do the same, so there can be multiple instances of an application/program running on one or more computers within the same domain.

Users of a computer or digital device on one domain may access any one of the other computers or digital devices on the same domain, or as is typically the case, a server or servers on the same domain can securely interact with the computers and devices within the same domain and any data associated with the domain server's is then available to those computers and devices. There may be further levels of permission that are required to allow computers to access one or more of the applications available on the server. Thus by definition an independent/isolated domain is one that does not permit other computers or devices which are standalone or part of another domain to operate its predetermined rules and procedures and thus does not allow access to servers or computers on that domain, or operation of the applications on those servers or computers.

An example of isolated domains includes:

- a domain of computers, supporting server's and digital devices, such as respective monitors and pointing devices as well as common and directly connected printers, the uses of which could be a small to medium business and the programs that such a business would use;
- a bank which has many domains including a domain for bank tellers to use to access the one or more servers that keep track of the funds held by depositors, loan portfolios, etc., the Automatic Teller Machines domain, the domain that exchanges funds between banks, except in particular circumstances for controlled access between bank domains or to access the domains of other banks, where each of the domains are not connected to any of the other domains;
- a Supervisory Control and Data Acquisition (SCADA) domain that is used to provide remote control of remotely located equipment, such as pumps, gates, process controllers in a factory and many other systems, such as power supply grids, water reticulation systems, etc.; and
- military command and control system domains where each domain has a different security level and is kept separate for operational and security purposes from each other and un-related domains or unauthorised computer devices; etc.

Where the term pointing device 5 is used within this specification, it may be referring to a cursor control device known as a mouse, but the general arrangement is such that pointing devices, can also include, a light pen, a digitiser, capacitive sensor pen, etc. and the these devices (which may also involve the operation of software) are generally understood to be particular type of peripheral devices used primarily to interact with a visual aspect of a relevant instance of a program. Peripheral devices (or apparatus) can also include, man-machine interfaces, such as voice control, movement detectors adapted to detect user actions (such as for example, hand, eye, finger, etc.) and may also include printers (2-D and 3-D), haptic force and sound force producing devices.

A computer typically presents a graphical user interface (GUI) to a user to aid with the interaction with and operation of that computer. A common method provided for users to interact with an Operating System is the desktop environment. This desktop environment allows multiple programs to be accessed and run on a single Graphical User Interface and presents many graphical elements to access the underlying file system and some of the Operating System internals. Some of these graphical elements include program windows, task bars, and icons. The idea being that these elements provide a convenient abstraction over the use of the underlying operating system primitives.

CDDC Introduction

Figure 7:
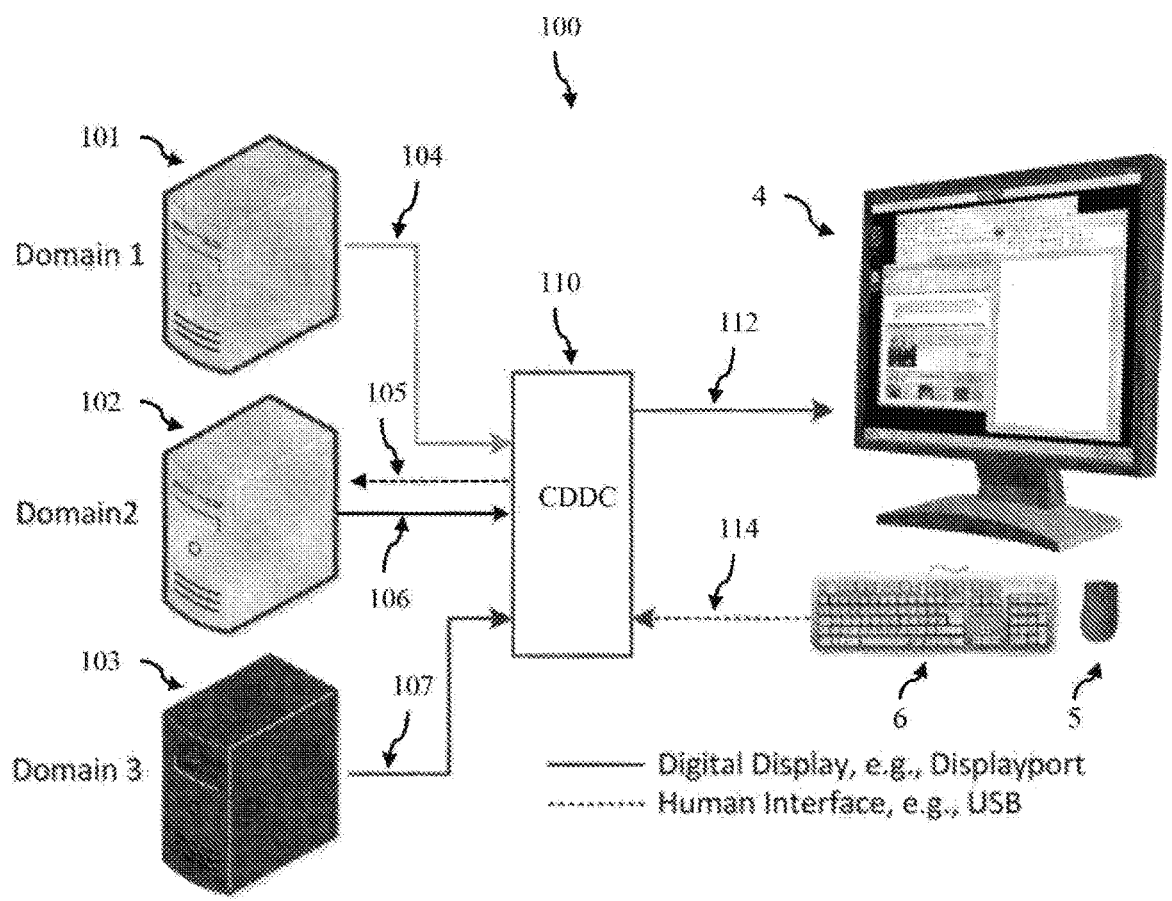
FIG. 7 depicts a simplified representation of an embodiment including three isolated domain computers, a single screen, a single keyboard and peripheral device (mouse pointer) and the CDDC.

This specification describes a number of embodiments of what is conveniently termed as a Cross Domain Desktop Compositor (CDDC) 110, which is an arrangement to provide access to, and control of, multiple independent computing domains through a single user interface. The CDDC provides a seamless and unified cross domain desktop environment for applications from multiple, potentially different classification, computing domains, without the need to trust any software residing on any of the individual domains. The CDDC 110 is useable in an environment where a user needs—for efficiency and convenience—to work across more than one domain so that the one person that has permission and the need to do so can use the normally isolated domains. FIG. 7 depicts a simplified representation of an embodiment of a system 110 including three isolated domain computers 101 102 103 in Domains 1 2 and 3 respectively, a single screen 4, a single keyboard 6 and peripheral device 5 (mouse pointer) and the CDDC 110. Solid lines 104 100 107 and 112 represent digital display (eg DisplayPort) data and dashed lines represent human interface (eg USB mouse) data.

The CDDC 110 composites graphical regions from the Graphical User Interfaces (GUIs) of different computing domains, typically the desktop environment associated with each computing, domain. Composition is the creation of a single (unified) desktop environment from separate, disparate graphical regions of the multiple independent domains, which is then output to a single display. The CDDC uses hardware-based window and desktop decorations to support user interaction, these decorations augment the composition. At any instance in time, one domain is designated as the active domain, having its graphical regions composited foremost and any user input directed to this domain.

To facilitate a seamless desktop experience, the graphical regions composited include such items as application windows, desktop icons, task bars, menus, dialog boxes, desktop notifications, and tool tips.

CDDC Compared to Prior Art

Figure 2:
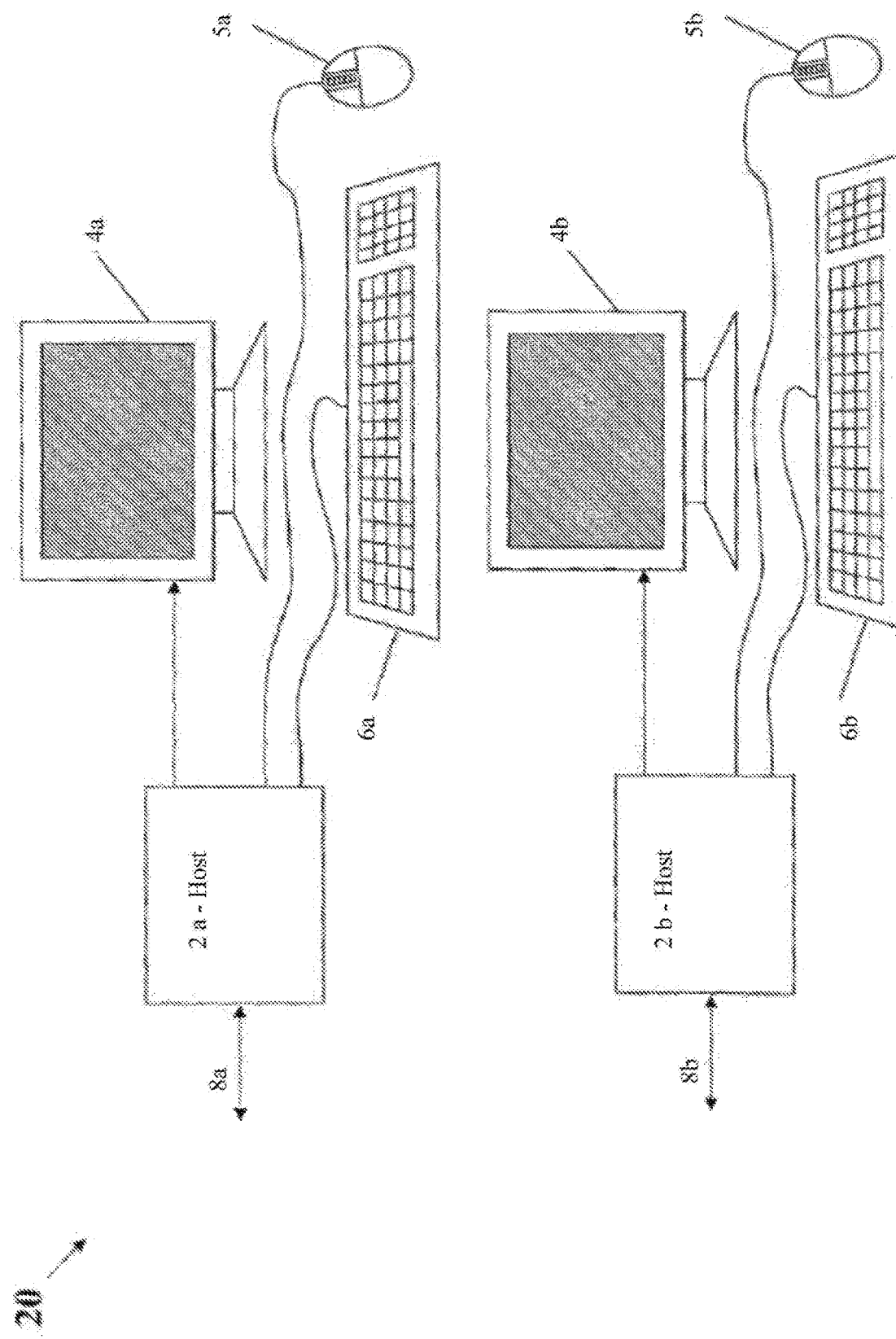
FIG. 2 depicts physically independent domains.
Figure 3:
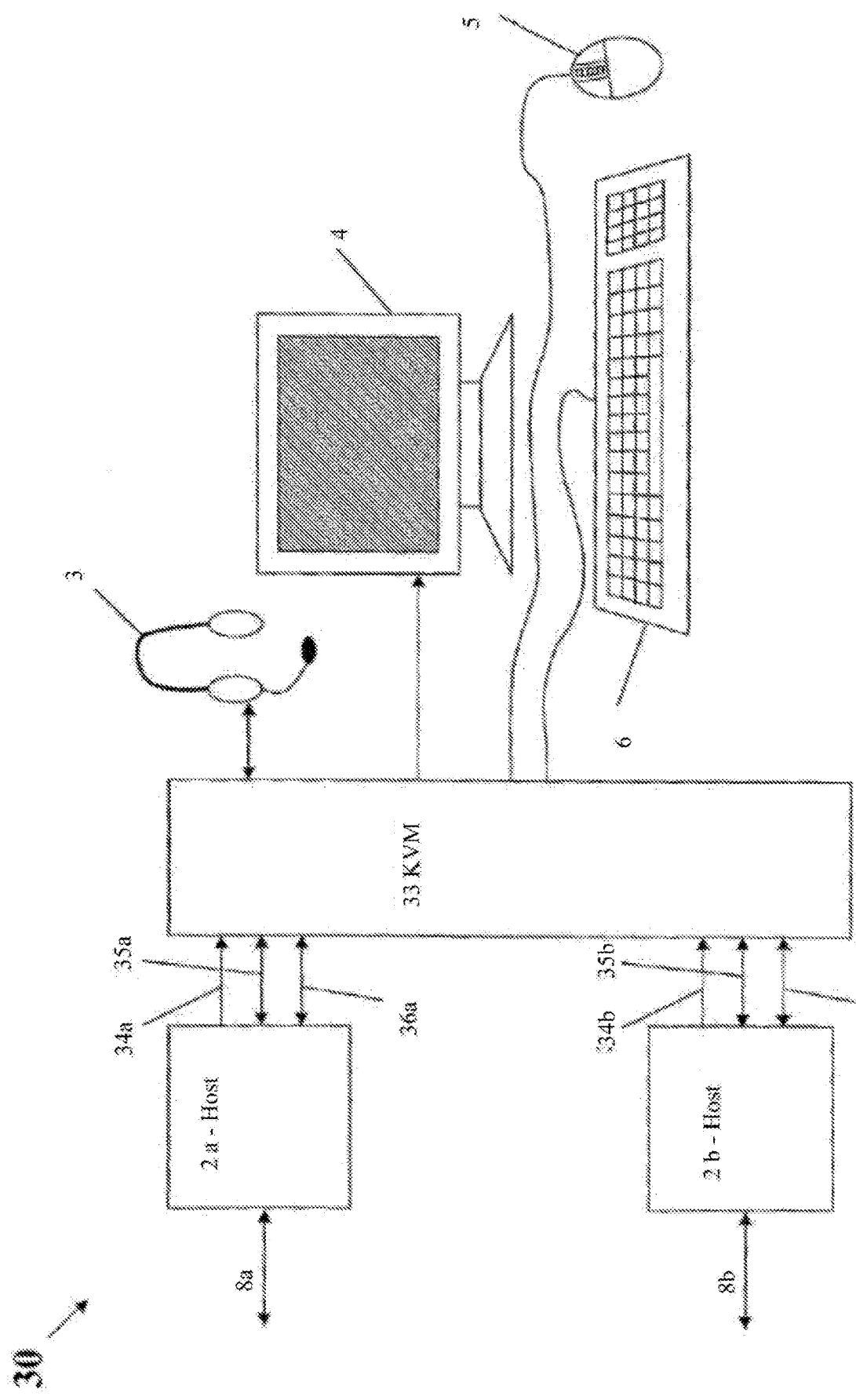
FIG. 3 depicts a KVM switch.
Figure 4:
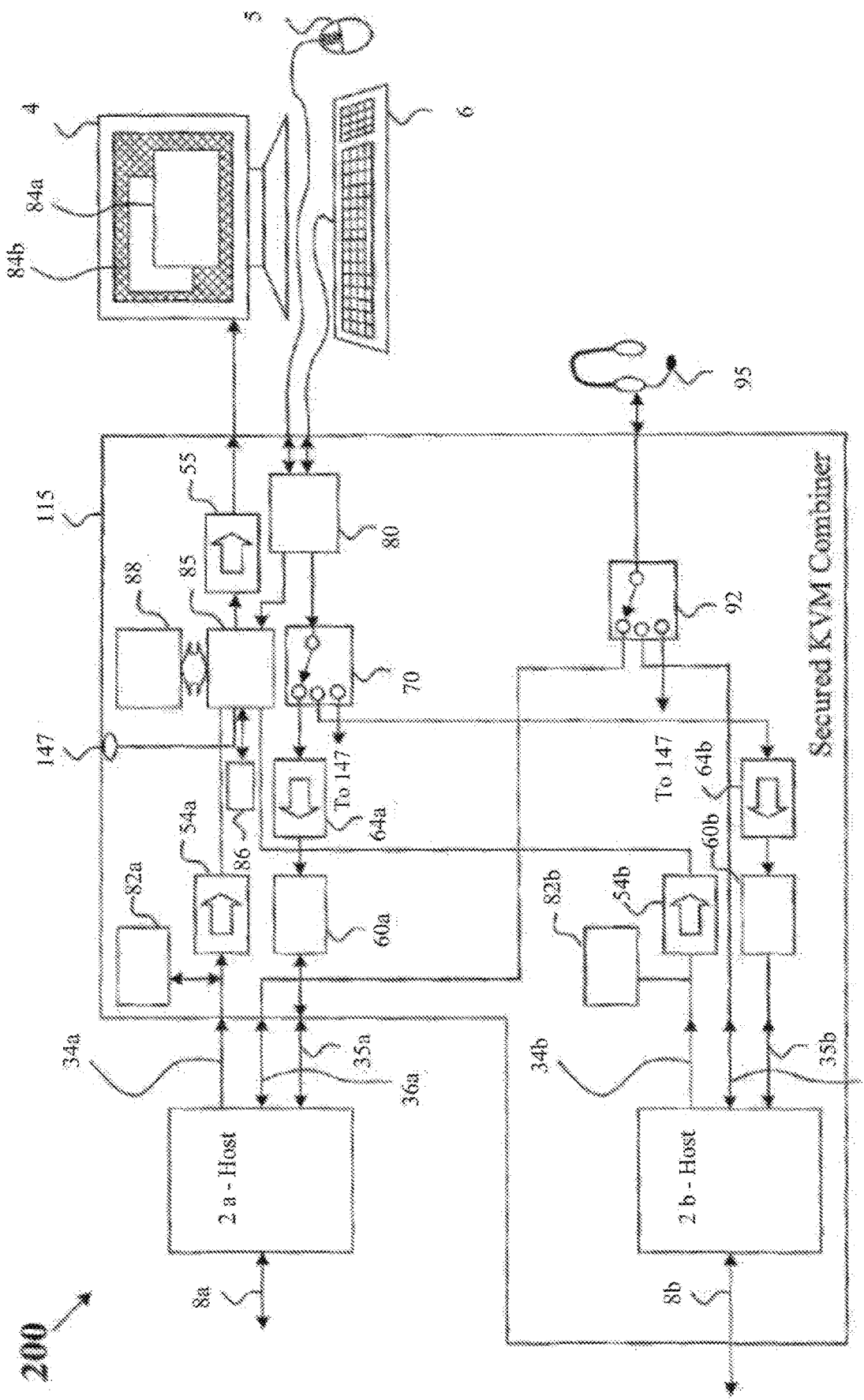
FIG. 4 depicts a prior art arrangement of a secured KVM combiner.
Figure 5:
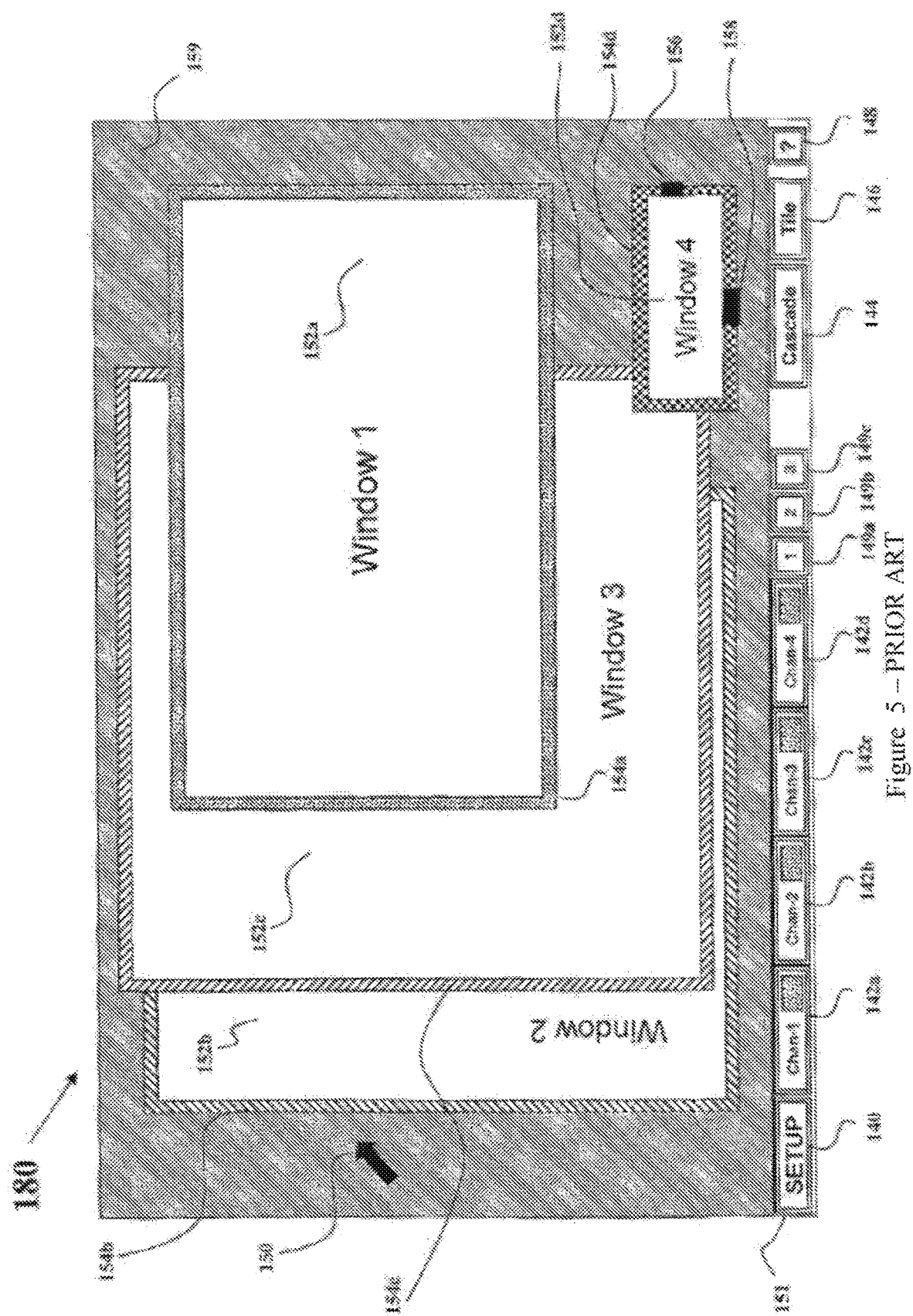
FIG. 5 depicts a further representation of the display provided by the prior art secured KVM combiner of FIG. 4.

Prior art has described how to facilitate accessing independent domains from a single interface. Prior art has also described how to protect this arrangement from data leakage (FIGS. 1 and 2). Further, prior art has described manners in which to concurrently display multiple computing domains (FIGS. 4 and 5 and in U.S. Pat. No. 8,769,172).

Figure 6:
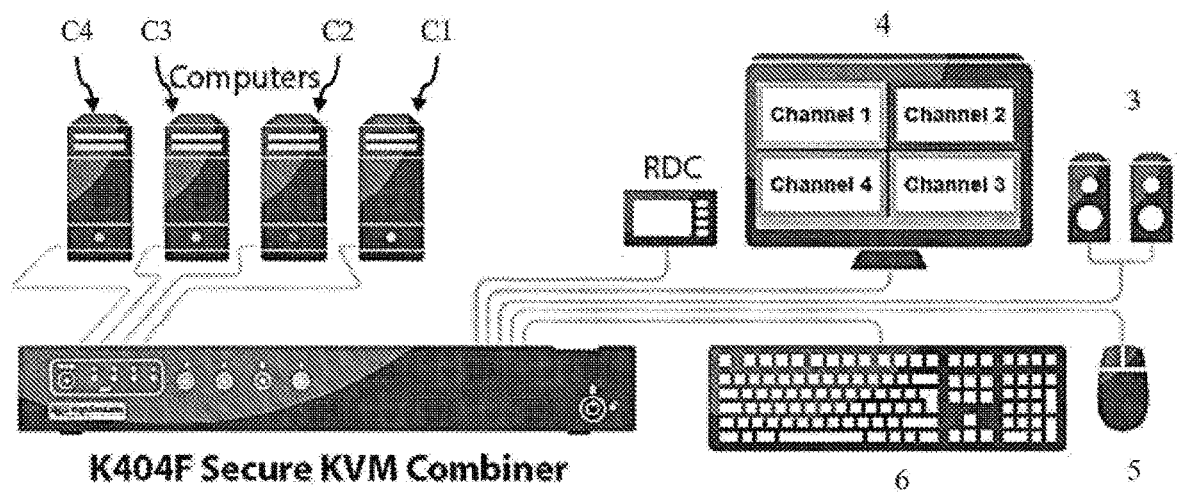
FIG. 6 depicts a yet further representation of the display provided by another prior art arrangement.

The distinction between the prior art and the functionality of at least one embodiment is that in the prior art, multiple desktop environments from the independent domains share the same monitor 4 in either a tiled, cascaded, or dominant manner (FIGS. 4, 5 and 6), whereas in an embodiment of the CDDC a composition of individual and multiple graphical elements (predetermined regions) from the independent domains form a single, unified desktop environment output and displayed on the same monitor 4 (FIGS. 7, 10-15).

The Prior art Secured KVM requires an on-screen generated menu to navigate between the distinct GUIs presented for each of the domains. Navigation between domains with the CDDC is implicit in the operation of the unified desktop.

An embodiment of the CDDC allows a user that would need to access to multiple isolated (e.g., different classification level or connected to different domains) desktop computers to use a single keyboard 6, single mouse 5 and single digital data display 4 in a multi-level secure (MLS) desktop experience. In this environment there are different domains each dedicated to a different level of security of data exchange within that domain but the principle is equally applicable to the work that needs to be done within two domains within the same organisation, such as when a computer domain administrator needs to access two different domains operated by the same organisation. The domains need not be of different security level but may simply need to be isolated from each other.

CDDC Operation

Figure 8:
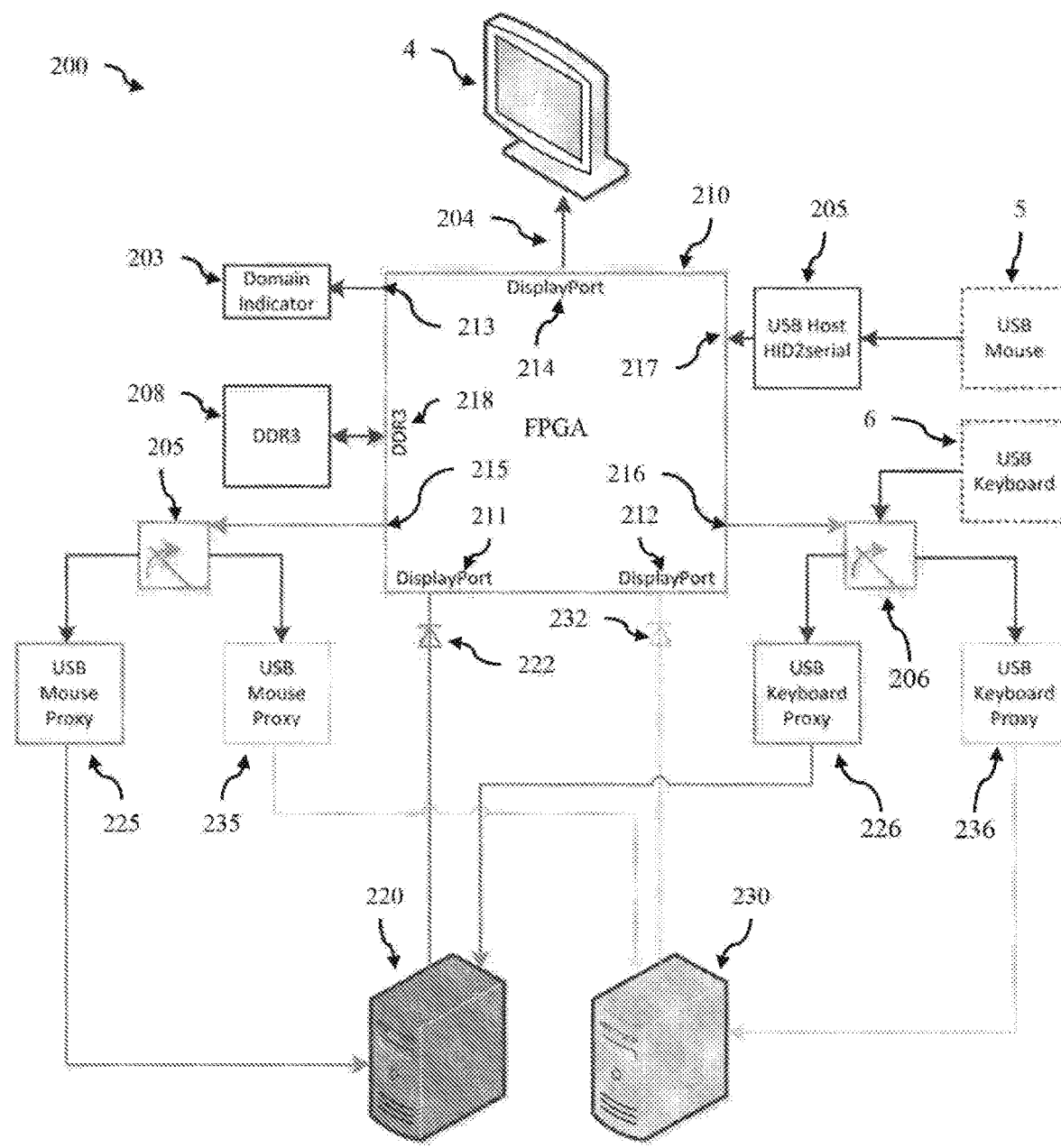
FIG. 8 depicts a simplified block diagram of an embodiment.

In one embodiment, multiple, independent, physically isolated desktop computers (or computing domains) are connected to the CDDC 110 via their digital display output (e.g., DVI, HDMI, or Display port) and their Human Interface Device (HID) inputs (e.g., keyboard and mouse). The CDDC then provides a separate trusted, keyboard 6, mouse 6 and display interface 4 for user interaction. FIG. 7 shows a typical system 100 where the inputs and outputs from three desktop computers 101 102 103 (respectively) are connected to a CDDC 110. FIG. 8 shows a simplified block diagram 200 according to an embodiment. The CDDC comprises a Field Programmable Gate Array (FGPA) 210 connected to a display 4 via display port 214 over which is sent composite digital display data output 204. The FPGA receives display data from a first display port 211 connected to a first computer 220 in a first domain via a one way diode 222 and receives display data from a second display port 212 connected to a second computer 230 in a second domain via a one way diode 232. The FPGA 210 also comprises a DDR3 interface 218 for connecting to a DDR3 memory 208 and provides a signal 213 to an external domain indicator 203, such as a LED on a housing. A USB mouse 5 is connected to a USB host HID2serial interface 205 which is connected to the FPGA 210 via input 217. The mouse data is sent to the domains from output interface 215 via a switch 205 to either the first domain USB mouse proxy 225 or the second domain USB mouse proxy 235 under the control of the FPGA. Similarly input from USB keyboard 6 is sent to the domains via a switch 206 to either the first domain USB keyboard proxy 226 or the second domain USB keyboard proxy 236 under the control of the FPGA.

The CDDC 110 is arranged to interact with each of the different rules and procedures of a respective domain and in particular one or more applications running on those respective domains, say in this example, one or more Microsoft Windows applications. The CDDC is capable of providing composited application regions on screen generally referred to as an application window or application from the isolated domains on the same screen, and provides keyboard and mouse interaction with each one of the displayed application windows from a respective domain, while maintaining each domain isolated from the other. The CDDC automatically switches the keyboard and mouse input between domains to maintain both usability and provide predetermined confidentiality guarantees.

The CDDC has digital display data processing function, which based on commands/activity from keyboard, mouse and host computers combine to form the composition of the digital display data from the independent domains, things like the layering of windows, which domain is active (in the sense that the keyboard/mouse are directed at this domain), position of the cursor, and decoration of graphical regions.

The digital display data compositor associates a predetermined display characteristic with each identified region.

The CDDC identifies the location of graphical regions (typically application windows) from each of the independent domains within the digital display data from each domain. The CDDC combines these graphical regions together to form a composited output digital display data, for interfacing to a user.

The CDDC decorates every composited graphical region displayed to uniquely identify its generator domain. In the first instance, decoration is a coloured border added around the extents of a graphical region. Undecorated content is treated according to a predetermined security policy, for example it may not form part of the composition at all.

The CDDC can generate on-screen display content for conveying information to a user. On-screen display content and individual window decorations are under the sole control of the CDDC and cannot be modified by the individual domains.

In an embodiment, a single trusted keyboard and trusted mouse are used to drive the CDDC with keyboard and pointer (mouse) interactions. At any instance in time the CDDC directs the trusted keyboard and mouse input to a single domain, designated the active domain. The CDDC can use on-screen display content to label the unified desktop environment with a currently active domain banner, highlighting to which desktop computer, or computing domain the keyboard and mouse are currently directed.

In a preferred embodiment, the keyboard and mouse are directed to the domain owner of the foremost composited window. An example is shown in FIG. 8, where one domain 220 is active and the keyboard 5 and mouse 6 are directed to that domain, with text being entered into a software application. No other domains 230 are receiving the user input at this time, or for that matter aware that user input being received at all by the active domain.

Figure 10A:
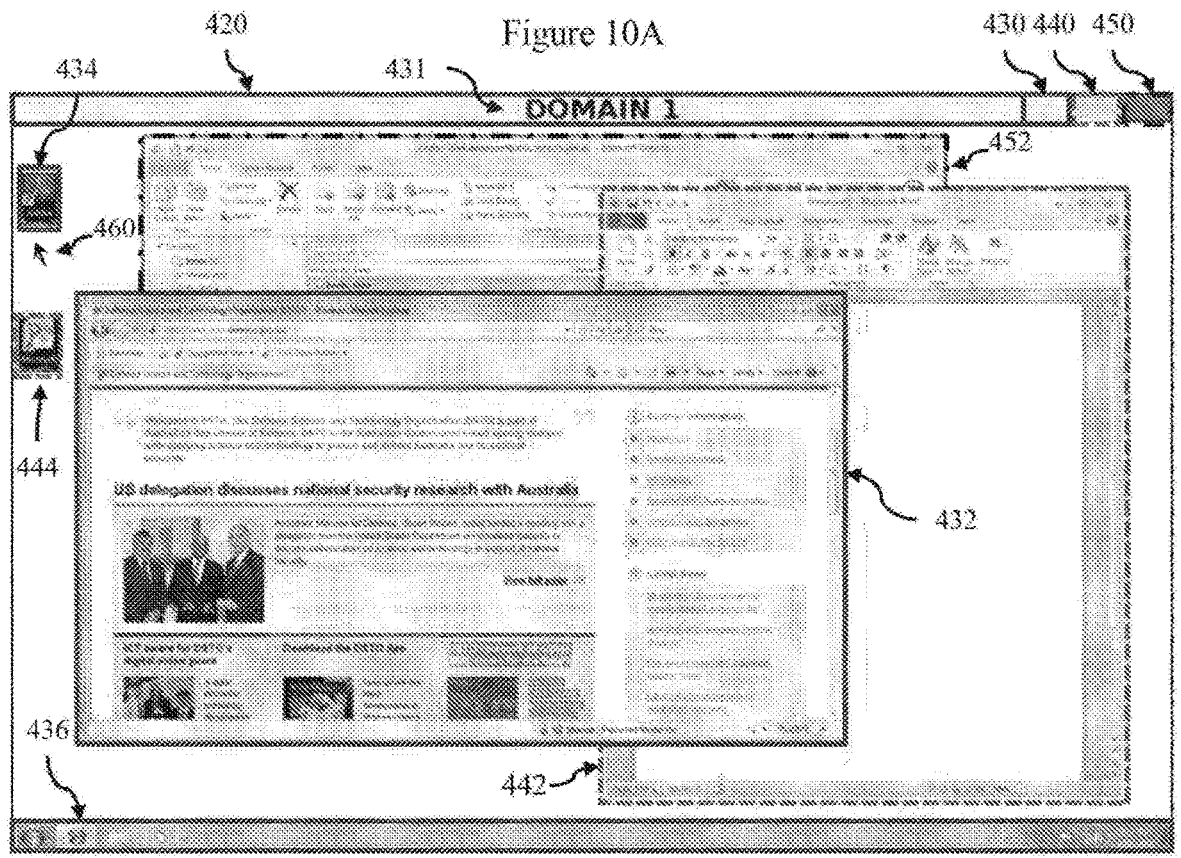
FIG. 10A shows a composite output generated from three domains with a first active domain according to an embodiment.
Figure 10B:
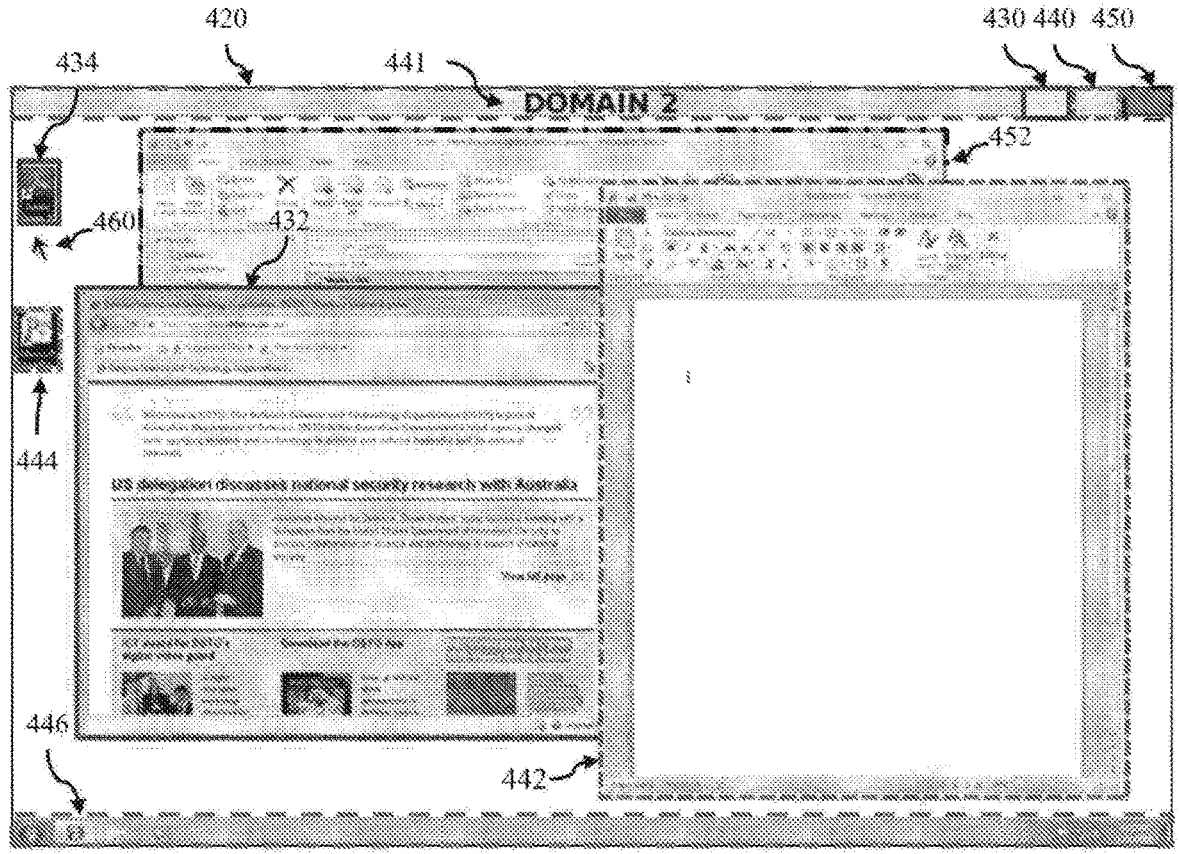
FIG. 10B shows the composite output of FIG. 10A when the active domain is switched to the second of three different domains according to an embodiment.
Figure 10C:
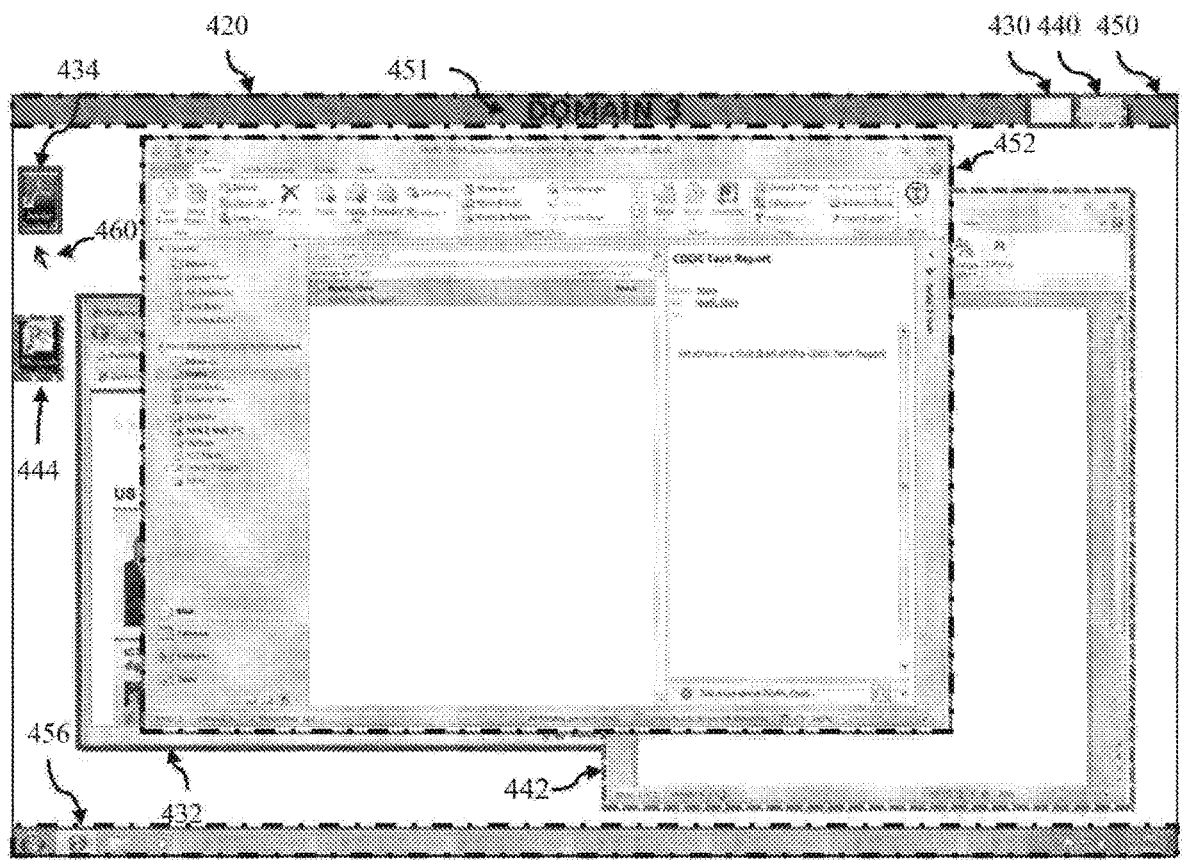
FIG. 10C shows the composite output of FIG. 10A when the active domain is switched to the third of three different domains according to an embodiment.

An active, first domain can be changed by clicking on a viewable region from another, second domain in the composited desktop environment output. In one embodiment, switching domains brings the set of application windows from the other, second domain to the front of the composited display; updates the active domain banner; and directs the trusted keyboard and mouse input to the newly active, second domain. FIG. 10A shows a composite output generated from three domains with a first active domain according to an embodiment. FIGS. 10B and 10C depict the changing composited output as the active domain is switched between three different domains, where each switch brings the windows from the newly activated domain to the front of the composition. With reference to FIG. 10A the composite output comprises a banner 420 which is coloured and bordered according to the domain and includes a domain label. The right hand edge of the banner 420 comprises three regions 430 440 450 each corresponding to one of the domains and that act as virtual buttoners to allow the user to select which domain to be active. Each region 430 440 and 450 has a coloured bordered and a similar fill, and each window or region associated with the domain uses the same coloured border. In FIG. 10A a first region using a blue solid border is active and window 432 is brought to the front of other windows. The first region also contains an icon 434 which is bordered with the blue solid border. The banner label 441 is listed as "DOMAIN 1" and the banner 420 and lower taskbar 436 is also bordered with the blue solid border to show the taskbar corresponds to the first domain. The cursor 460 is also shown. FIG. 10B shows the composite output when the second domain is active. As can be seen in FIG. 10B, the borders around the banner 420 and taskbar 446 have changed to purple dashed lines and the border label 441 has changed to "DOMAIN 2", and the domain 2 window 442 has been brought to the front and now obscures first region window 432. FIG. 10C shows the composite output when the third domain is active. As can be seen in FIG. 10C, the borders around the banner 420 and taskbar 446 have changed to black and red dash dot line and the border label 451 has changed to "DOMAIN 3", and the domain 3 window 452 has been brought to the trout and now obscures first region window 432 and second region window 442.

The CDDC ensures that no information about the digital display data can be shared or inferred between independent domains. Similarly the CDDC ensures no information about the keyboard or mouse data can be obtained or inferred by any domain, other than the domain currently expected to be receiving the keyboard and mouse intimation.

CDDC: High Level Example

The CDDC provides the capability to interact with multiple domains that are inputted to the CDDC via, in one embodiment, their digital data display output (e.g., digital data display port output from a display card (sometimes referred to as a video card) or a respective computer which is part of a respective domain).

In one embodiment the keyboard and pointer data is obtained from a USB keyboard and mouse connected to the CDDC.

In one embodiment the domains receive keyboard and pointer input via a separate USB connection from the CDDC to each domain.

A user interacts with a unified desktop array of monitor, keyboard and pointer devices, in response to which the CDDC decorates every graphical region displayed (typically in an image form called a window) to uniquely identify that windows' source domain.

The use of the term window is not a reference to an entire screen of data or to the Microsoft Inc. operating system but merely to the visual arrangement of an instance of a graphical element output by the underlying operating systems, or computing domain.

Within the window is an instance of a program running to provide the digital data displayed in that respective application window and this includes the provided application window/s, desktop icons, task bars, menus, dialog boxes, desktop notifications, tool tips, etc.

Application windows being run and the method of displaying that instance of the program running are bound by a border which is typically rectangular in 2-dimensional shape but which can be resized in length and height by the user if the window is of the type that in normal use are resizable. However, task bars, menus, icons, tool tips, dialog boxes, notifications, widgets, etc. may not normally be re-sizable. Such an interaction is not excluded by the operation of the embodiments.

Figure 13:
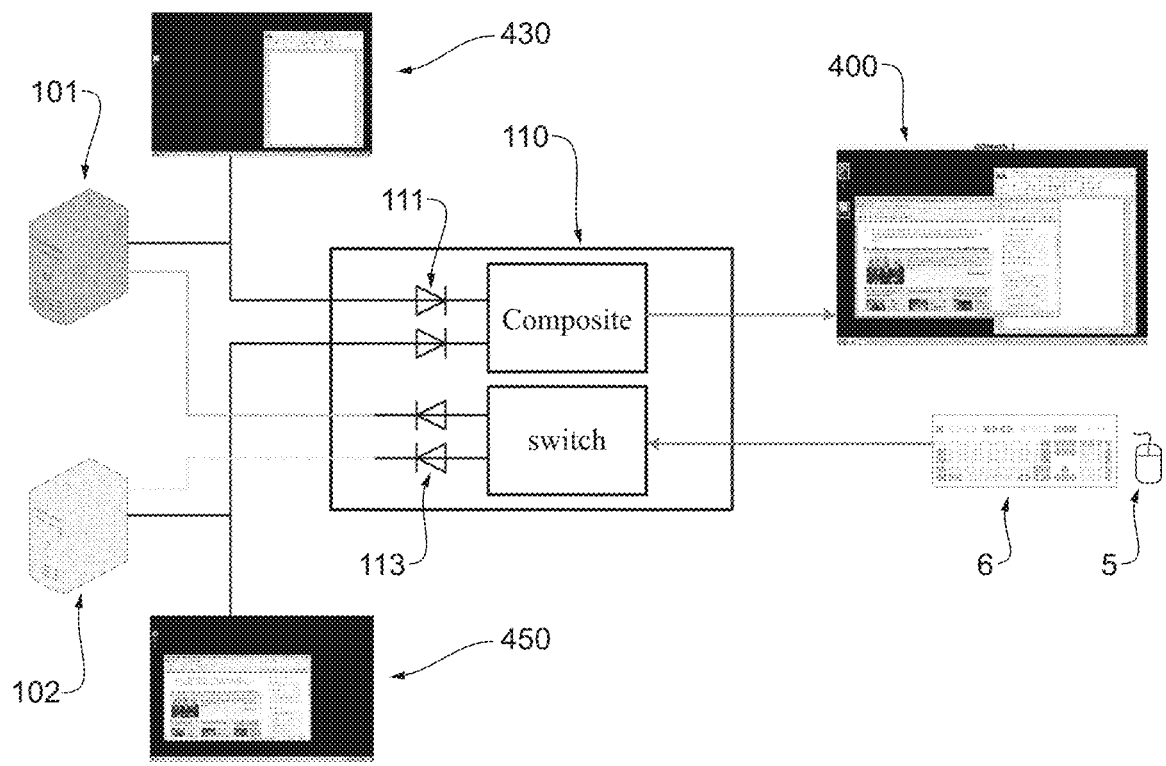
FIG. 13 depicts individual, isolated domains which logically have their own desktop with their own graphical elements and illustratively an embodiment of the Cross Domain Desktop Compositor (CDDC) identifies the graphical elements (predetermined regions) and composes them into a single output.

In one embodiment the decoration associated with each window is a coloured border of predetermined dimension added to a location on the display around, or part of, the periphery of one and one only of the displayed windows. FIG. 13 depicts an example of the decoration on a per window basis.

In some embodiments, the decoration is unrequired, the utility of the device simply provided by knowing that any content being displayed from different domains is physically isolated, and that data leakage is being prevented.

Composition in Detail

In a typical composition, the desktop environment for the active domain would have its graphical regions (e.g., application and control windows, desktop icons, task bars, menus, etc.) composited on top of (or in front of) the graphical regions for other domains. Windows are typically composited in the same position they exist in their native desktop environment.

In a preferred embodiment, all domain desktop environments share similar base graphical elements; this results in the control interface (e.g., task bars, common desktop icons, etc.) only being visible for the active domain. This intuitively helps the user operate within the unified environment.

The CDDC maintains the global position of the cursor, mapped onto the current display resolution of the unified desktop output. The CDDC renders the cursor on top of the composited output, preventing spoofing attacks from any individual domain. The mouse position and keyboard input are then directed to the active domain. When an active domain switch occurs, the keyboard is first disconnected from the previously active domain and then switched to the newly activated domain. Further practical steps can also be taken to mitigate potential covert channels and some of these measures are detailed later in the specification.

To composite the various graphical elements from the various domains, the CDDC requires knowledge of the location of the windows, or graphical regions of interest in the digital display data streams provided from the domains. This information can be provided in a number of manners, e.g., algorithmic detection by the CDDC, chroma-key information, or a side-band channel like a separate USB input or in-band with the digital display data stream. In a preferred embodiment, the regions are identified by untrusted software residing an the independent domains and sent in-band within the digital data video stream to the CDDC, the mechanism and protocol used to identify the various regions is detailed later in the specification.

Algorithmic detection relies on the CDDC being able to discern important graphical regions from each domain to incorporate into the final composition. This can be done based on various visual indicators within the domains' desktop environments, including various shapes, colours and textures as received by the CDDC within the digital video stream.

The digital display data compositor defines an ordering on the predetermined regions.

Once the position of the various, typically rectangular, regions of interest are known, the CDDC can operate on those regions appropriately. The CDDC has complete control over what is rendered at every pixel on the output composited display. The composition can be considered as the layering of priority content. Basic composition entails the CDDC layering the identified content from all domains' digital display data in a defined order. This order is determined solely by the CDDC, but may be influenced by the order in which the domains were last active.

Window regions within a specific domain are kept in the same order, as the CDDC only has access to the raw digital display data stream, and hence can only manipulate already drawn graphical regions. A typical composition layering is shown in FIG. 11.

Figure 11:
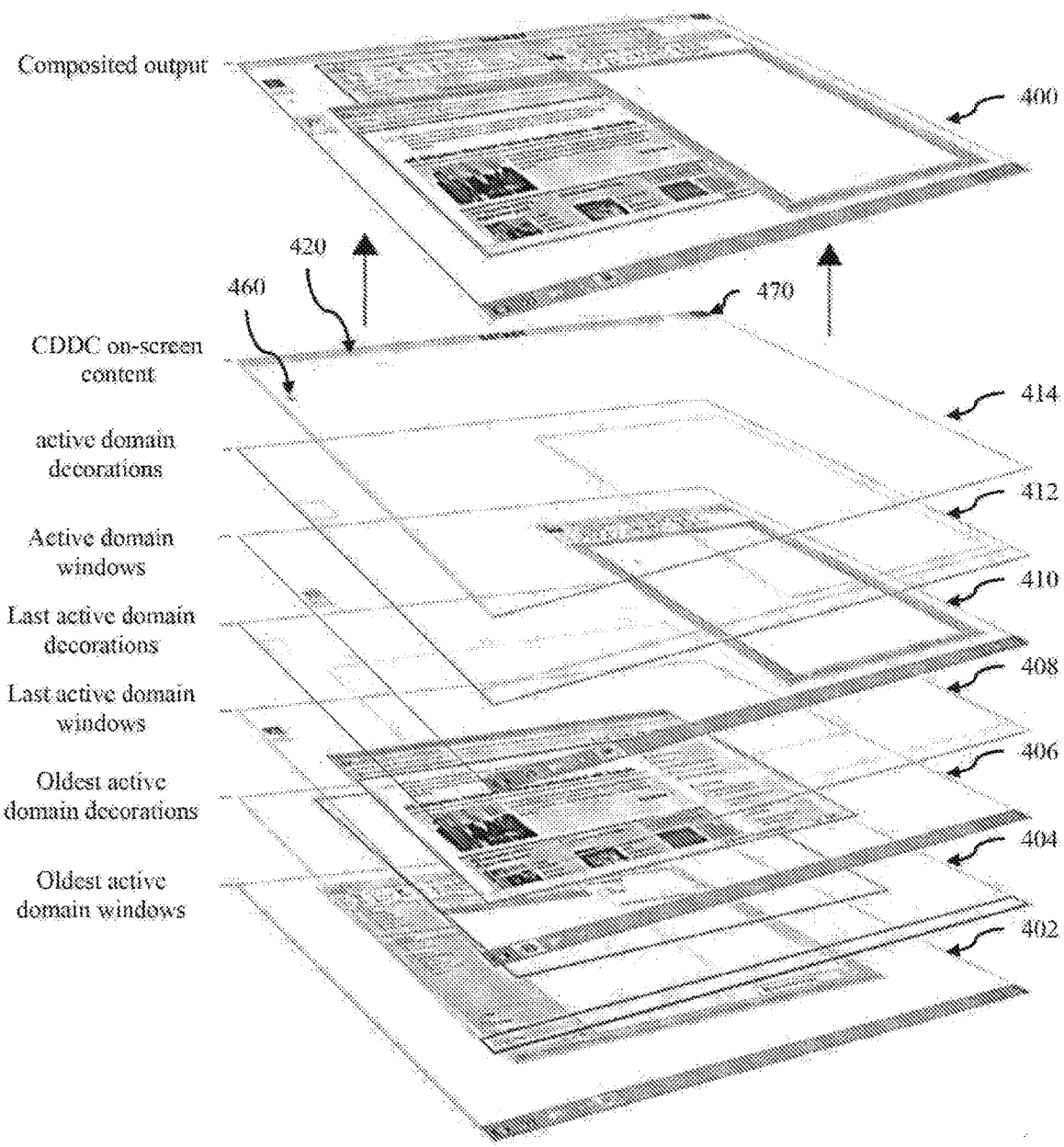
FIG. 11 depicts various video data inputs composed into a unified desktop originating from multiple isolated domains, clearly showing that content has come from different domains and depicting over within a unified desktop context with the composited result (upper most in the illustration)

FIG. 11 shows that the composited output 400 content is layered: oldest active window set 402, window decorations 404, next active window set 406, window decorations 408, and so forth for each domain, up to, current active window set 410, and current active window decorations 412. Finally other on-screen display content generated by the CDDC 414, and then the cursor information is layered on top of everything else.

Figure 22:
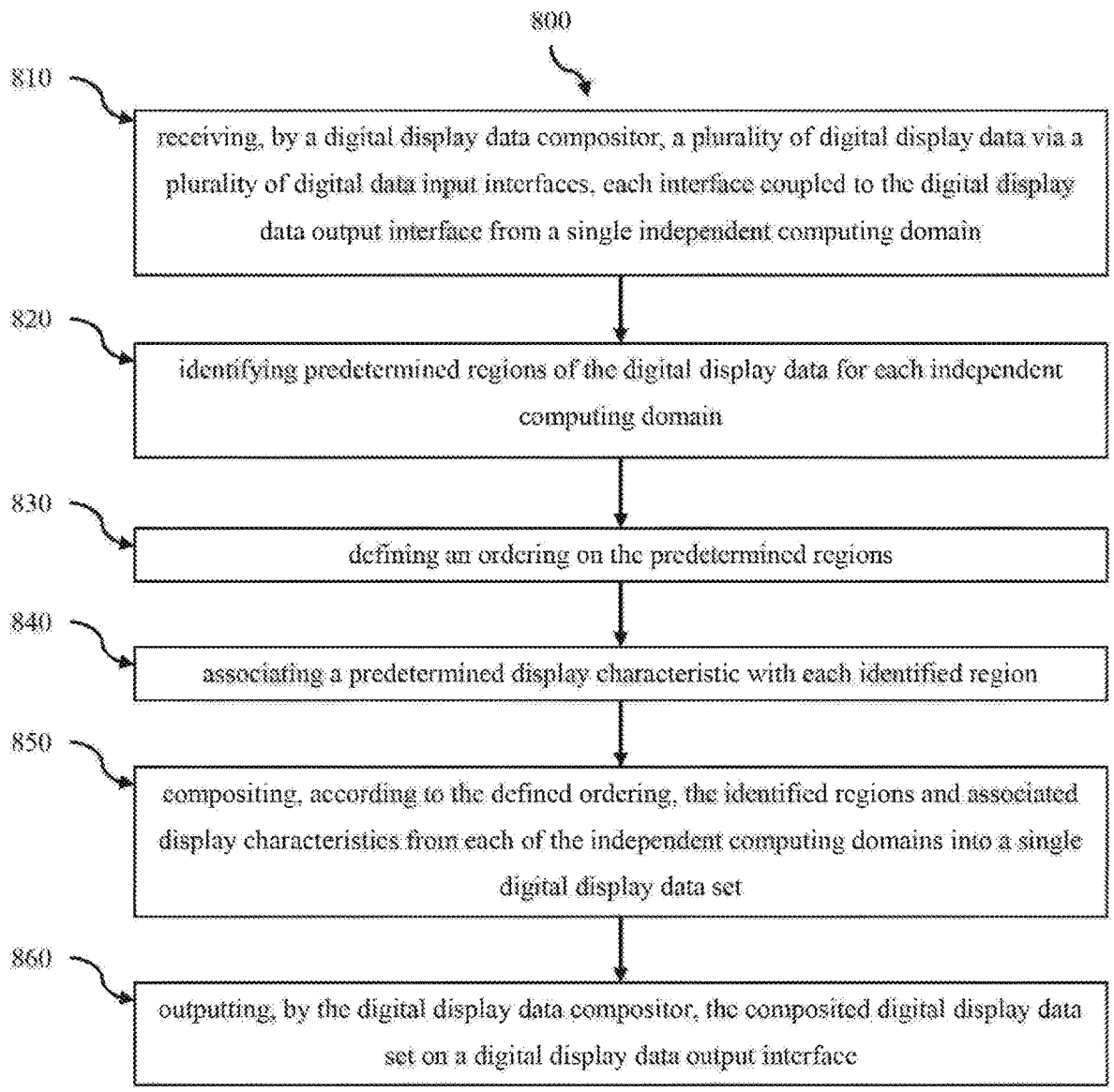
FIG. 22 is a flowchart of a method according to an embodiment.

To further illustrated FIG. 11 and assist in understanding this embodiment FIG. 22 shows a flowchart of a method 800 for secure digital display data composition by the digital display data compositor (CDDC) to allow simultaneous display of different classes of display data where, each class of display data corresponding to a unique independent computing domain according to an embodiment. The method comprises:

Step 810: receiving, by a digital display data compositor, a plurality of digital display data via a plurality of digital data input interfaces, each interface coupled to the digital display data output interface from a single independent computing domain;

Step 820: identifying predetermined regions of the digital display data for each independent computing domain;

Step 830: defining an ordering on the predetermined regions;

Step 840: associating a predetermined display characteristic with each identified region; and Step 850: compositing, according to the defined ordering, the identified regions and associated display characteristics from each of the independent computing domains into a single digital display data set, and Step 860: outputting, by the digital display data compositor, the composited digital display data set on a digital display data output interface.

The digital display data compositor associates a predetermined display characteristic with each identified region. This may be a border of a certain dimension, colour and/or line type, or even an animation.

Layering of pixel information is exclusive, meaning that no information about lower composited layers is revealed if pixel content for a higher layer exists. The output only contains information about the top-most composited layer at any particular pixel location. Lower layer content still remains visible where it is not occluded by a higher layer, that is, where no higher layer content exists at a particular pixel location.

Figure 12A:
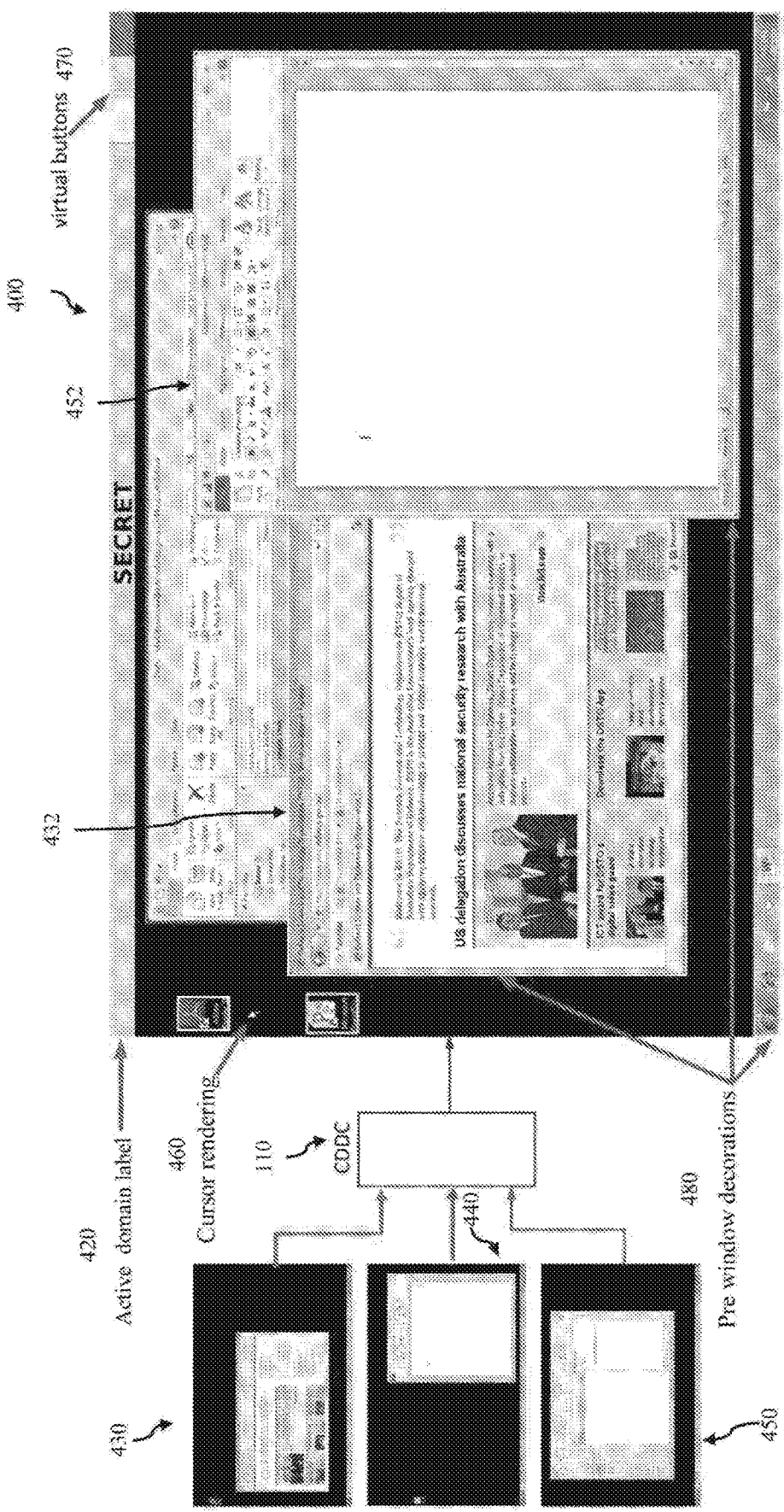
FIG. 12A depicts three video data outputs from three isolated domains being received by an embodiment of the CDDC and the resulting composited screen showing at least portions of all three of the video data outputs.
Figure 12B:
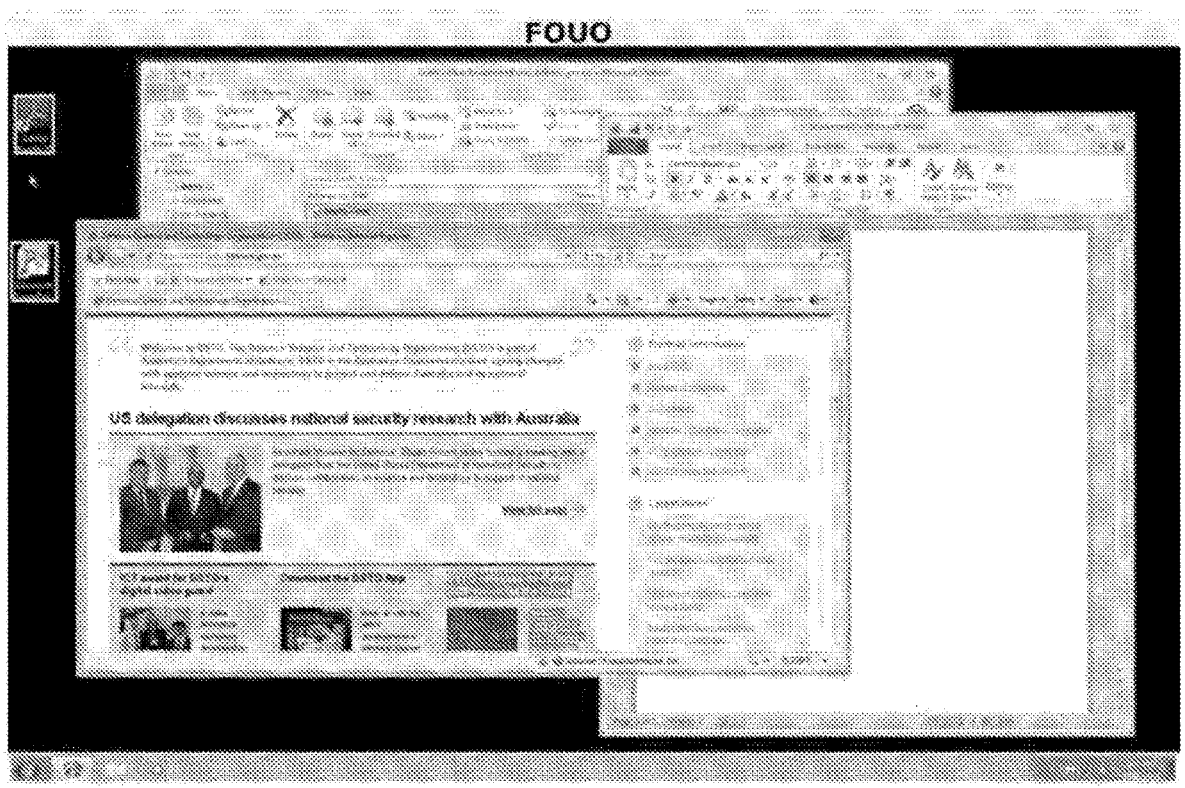
FIG. 12B depicts the composited screen of FIG. 12A when switched to another domain.

FIG. 12A depicts three video data outputs 430 440 450 from three isolated domains being received by an embodiment of the CDDC 110 and the resulting composited screen 400 showing at least portions or all three of the video data outputs. In FIG. 12A the SECRET domain 450 is active, and the windows from the SECRET domain, in this case the task bar and Microsoft Word windows 452 are decorated 480 and composited as the foremost windows. The FOUO (For Official Use Only) domain windows, eg browser window 432, are drawn as the next foremost windows, and hence are overlapped by the SECRET windows eg Microsoft word window 452. In contrast to this display arrangement, FIG. 12B depicts the FOUO domain is foremost in the monitor display. The cursor 460 is rendered over all windows. An active domain label 420 is also shown, as well as virtual buttons 470 allowing the user to switch between domains.

Regions of the composited display that do not correspond to any graphical regions identified by any domains are also rendered by the CDDC. This might include being a static background, or depending on security policy, could be the remainder of the content, that is unidentified content from the currently active domain. There is also the option to grey-out this content if it is displayed, indicating to a user that the content has not been identified by the domain, and preventing certain spoofing attacks.

FIG. 13 depicts two individual, isolated (independent) domains 101 102 which logically have their own desktop 430 450 with their own graphical elements and also illustratively depicts an embodiment of the CDDC which identifies the graphical elements (predetermined regions) from the digital display data supplied to the display interface input port of the CDDC from each domain and those predetermined regions are then composed into a single digital display data output 400 for display on the CDDC monitor 4.

The digital display data compositor composes 110 the identified predetermined portion of the digital display data and associated predetermined display characteristics for all independent domains into one composed digital display data output.

FIGS. 10A to 13 and others depict examples of independent domains with the foremost visible application associated with one of those domains being fully visible, in that all of the decoration of the border of the Window of that application is visible, while the rearward located window/s have a different border and are partially hidden from view. In a preferred embodiment, only the domain associated with the foremost visible applications and associated desktop icons, task bars, menus, desktop notifications, tool tips, etc. is provided digital data from the peripheral devices, such as the mouse and keyboard.

Figure 12C:
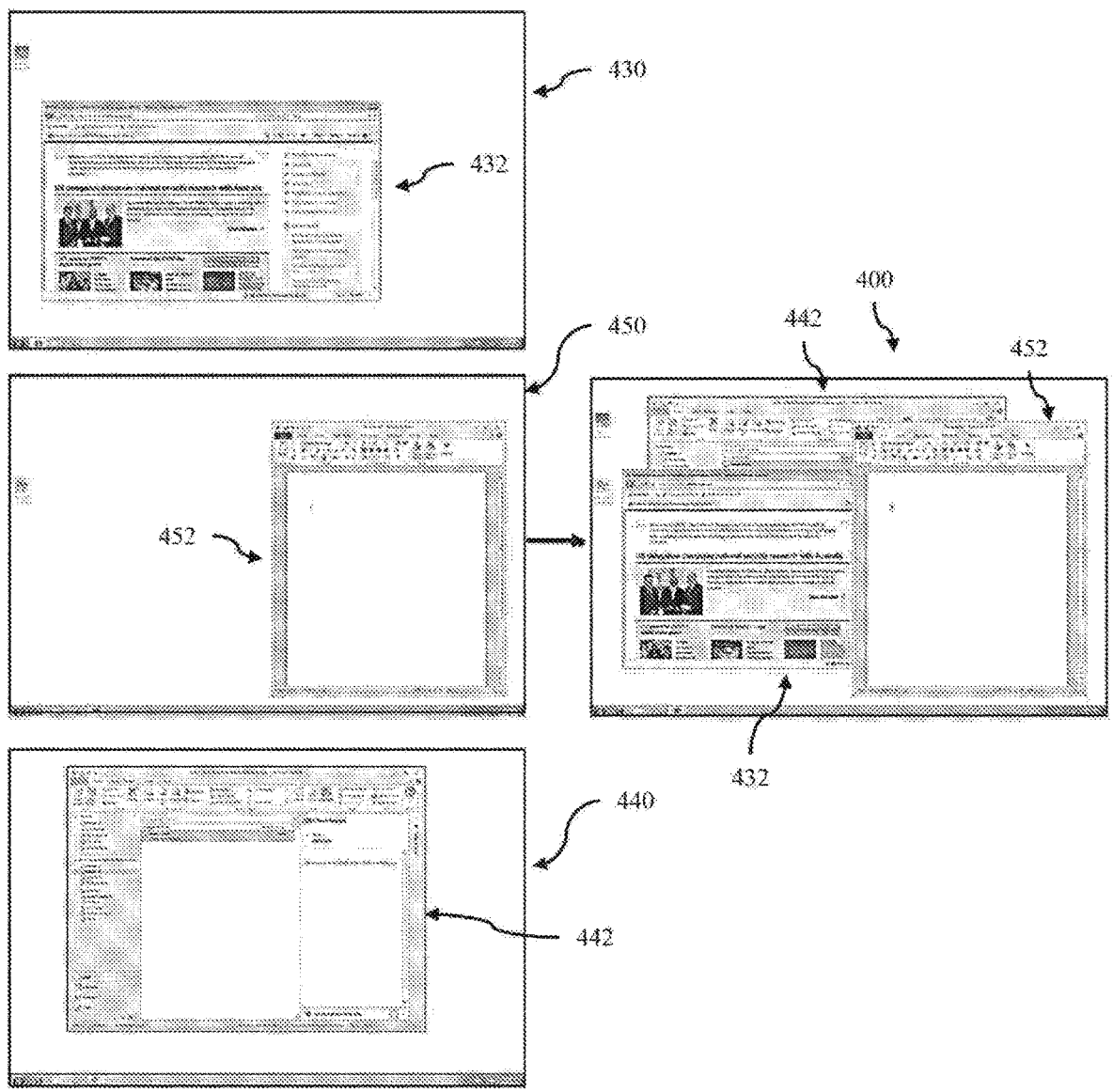
FIG. 12C depicts the three individual video data outputs and the single unified composited video data output as displayed to a user.
Figure 12D:
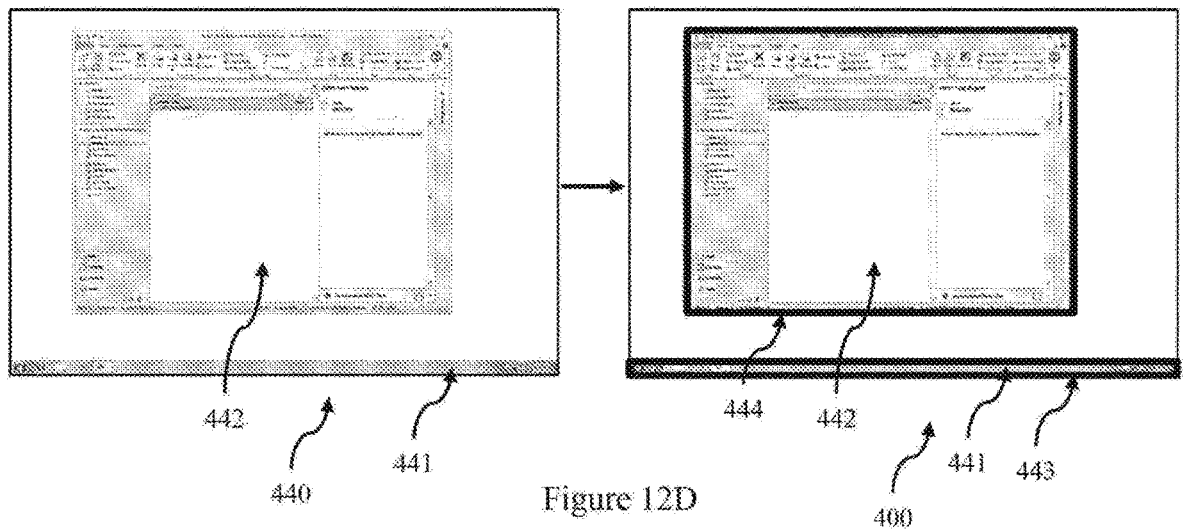
FIG. 12D depicts the difference between a display portion that is not decorated and the same portion that is decorated.

A screen shot of the composited display is shown in FIG. 12A where the SECRET application window is foremost and the upper portion of the screen is decorated with a domain banner of the same colour as that used to decorate the active application window. FIG. 12B depicts the FOUO domain is foremost in the monitor display. FIG. 12C more clearly displays three separate application windows on the left hand side and the right hand side shows the composited monitor display supplied by the CDDC (FIG. 12A). FIG. 12D depicts the difference between a display portion that is not decorated and the same portion that is decorated. In this embodiment window 442 in display 440 is undecorated and when displayed in composite output 400, a border is added to the window 444 and taskbar 446.

In some embodiments, the CDDC may, depending on security policy selectively display, or not display content from particular domains, irrespective of whether regions of interest have been identified from that particular domain.

In some embodiments, if a first domain provides no information to identify portions of the display, when the first domain is active the CDDC show the output only from that domain's digital display data input only and no information from any other domain. The CDDC may still render on screen display content including the domain banner, virtual buttons, and cursor. When the first domain is not the active domain, no information from that domain will be output to the display.

The digital display data compositor composes, according to the defined ordering, the identified regions and associated display characteristics from each of the independent computing domains into a single digital display data set.

On-Screen Display Content

The CDDC generated on-screen display content is very important to the operation of the system. The domain banner at the top of the screen is implicitly trusted by a user to indicate the currently active domain. This banner and corresponding region of the digital display data output can only be drawn to by the CDDC. Similarly, the decorations around each window need to be the correct colour and uniquely identify to which domain the content belongs. The algorithms used for window decoration are described later in the specification.

Figure 14:
FIG. 14 depict a drop down menu rendered on-screen by the CDDC allowing a user to choose which domain should be active prior to selection.
Figure 15:
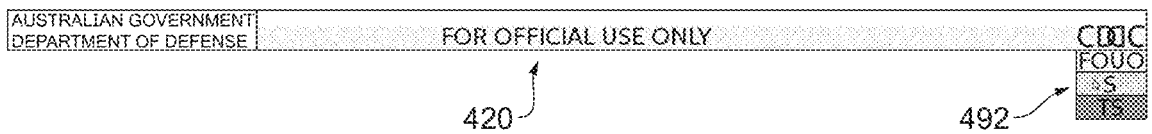
FIG. 15 depicts a drop down menu rendered on-screen by the CDDC allowing a user to choose which domain should be active.

The CDDC uses the trusted mouse input to drive a domain independent cursor for user interaction. With complete control of the cursor and the ability to draw on the digital display data output, the CDDC can create arbitrarily complex interfaces to both communicate with a user, and to allow a user to control the CDDC. Simple examples include on-screen virtual buttons 470, generated as shown in FIGS. 10A to 10C and FIG. 12A. In another embodiment the CDDC the virtual buttons 470 in the banner 420 could be replaced with a drop down menu 490 that drops 492 when the cursor is hovered over the menu as shown in FIGS. 14 and 15, and other user interface items to allow certain features of the composition to be controlled, e.g., controlling the colour assigned to a particular domain, or specific security policies associated with composition.

In one embodiment, the CDDC generates an on-screen display banner located in a readily visible location on the monitor using digital display data, e.g. along the bottom or top of the visual display monitor visible at all times to the user of the monitor. The banner is intended to indicate to the user, with for example, colour, text or symbols or combinations of these, which domain is currently active (referred to herein as a domain banner), and thus to which domain/enclave and therefore the application, the digital data being output by the trusted keyboard and trusted mouse are currently directed. By way of example, the domain of the foremost visible application window on the monitor, which as described above, is also appropriately decorated so as to make it obvious which window is active and from which domain it is provided from.

Human Interface Device in Detail

In an embodiment the CDDC provides a separate mouse and keyboard proxy for each domain and the proxies maintain a logical Human Interface Device (HID) connection at all times. The mouse position and the keyboard input, derived from the trusted mouse and keyboard inputs are only forwarded to a specific proxy and the corresponding domain when the domain is active. At this time no other domain has access to the keyboard and mouse information and the user is alerted to the current domain through an on-screen domain banner.

The input from the trusted keyboard and mouse can be modified by the CDDC before it is passed through to the active domain. The input may also be consumed by the CDDC and not passed through to the active domain at all.

The input from the trusted mouse and keyboard can be used to control the CDDC and its actions. For example trusted mouse movement and mouse clicks can be used to switch the active domain.

The granularity of control over the mouse and keyboard switching allows the CDDC to do more creative keyboard and mouse interaction with the domains, if required. Examples include: sending simultaneous clicks to all domains when a true (CDDC generated) multi-level secure (MLS) virtual button is clicked on the screen; replicating keyboard entry to all domains when a CDDC generated on-screen display text field is typed in; and allowing mouse position to be reported to whichever domain owns the window region the cursor is currently hovering above, as opposed to just the currently active domain.

Data Diodes

To prevent data leakage, unidirectional forcing components 111 are used on the display inputs received from each independent computing domain, preventing information flow from the CDDC back to the domains via the digital display data interface (see FIGS. 8 and 13). Further, unidirectional forcing components 113 are also used on the HID outputs sent to the independent domains, preventing information flow from the independent domains to the CDDC via the HID data path.

Switching in Detail

In a preferred embodiment, switching domains brings the set of application or graphical window/s, from the chosen domain to become the foremost visible window/s of the composited display and thus to become the active domain.

In a preferred embodiment, the trusted keyboard input and mouse information are simultaneously switched. Solely directing their inputs to the now active domain.

The act of switching domains maintains physical isolation between domains at all times, no trusted keyboard or mouse input is ever transmitted to a domain that is not the active domain, and no information about what is being displayed from each domain can be inferred by another domain.

In a preferred embodiment, a user can change/switch between domains by simply using the trusted pointing device input (mouse) and associated CDDC interface elements, to position the CDDC generated cursor on the monitor screen/display over an application window of another domain and simultaneously click a button on the mouse. Alternately physical buttons on the front of the CDDC box, or virtual on-screen display buttons operated by the pointing device and a click can be used to switch domains or further a designated key on the keyboard can initiate the switching of application and hence domain.

Domain Software in Detail

In some embodiments, to support the identification and compositing of graphical regions by the CDDC, untrusted software running on each independent domain is used to identify these regions first on the independent desktop environments. This information is then sent to the CDDC. The CDDC uses this information to decide which graphical elements or regions from each domain should form part of the final composited desktop environment presented to a user.

The digital display data compositor identifies a portion of the digital display data input for each independent domain.

The host computers/domain computers encode the position of graphical elements within their individual desktops (predetermined regions). In one embodiment this includes desktop window elements like task bars, application windows, dialog boxes, icons, tool tips, menus, etc.

Any software residing on the independent domains is assumed to be untrusted. Domain software can therefore be uncooperative in identifying important graphical regions, and instead of helpfully identifying application windows, desktop icons, task bars, etc., the software may instead provide incorrect or useless information to the CDDC. In this instance, the CDDC still operates correctly, with all information provided about regions, correct or not within the desktop environment still being decorated by the CDDC. Whilst the decorated regions may not be useful application windows, a user is able to discern from which domain they originate, and the on-screen display domain banner reliably informs a user to which domain the inputs from the trusted keyboard and mouse are currently directed.

In one embodiment, each domain runs the Microsoft Windows (MS Windows) 7 Operating Environment. Untrusted software residing on the domain identifies graphical regions (application windows, task bars, dialog boxes, menus, tool tips, etc.), it does this by enumerating a list of windows through the Windows API. This list contains windows for everything from applications to task bars, pop-up windows, dialogue boxes, menus, and tool tips. The list is traversed and processed to determine an appropriate set of windows. Microsoft Windows is only an example, other operating environments, real-time operating systems, and domain-based software can be equally used to identify and report the position of graphical elements to the CDDC.

In a preferred embodiment the domain software removes duplicate window regions, and some items fully enclosed within other windows, for example some tool-tips, dialogue boxes and menus. Ignoring windows fully encapsulated by other windows provides a cleaner user interface.

In a preferred embodiment the z-order (stacking or layering order of application windows displayed on a desktop environment), location, and size of the window is then forwarded to the CDDC. Typically the location and size of the graphical region reported is rectangular.

In an embodiment, this information is passed in-band in the digital display data stream to the CDDC and is used by, but not trusted by the CDDC. Other embodiments could send this information via USB, other peripheral channel, or even network.

Figures 16A, 16B:
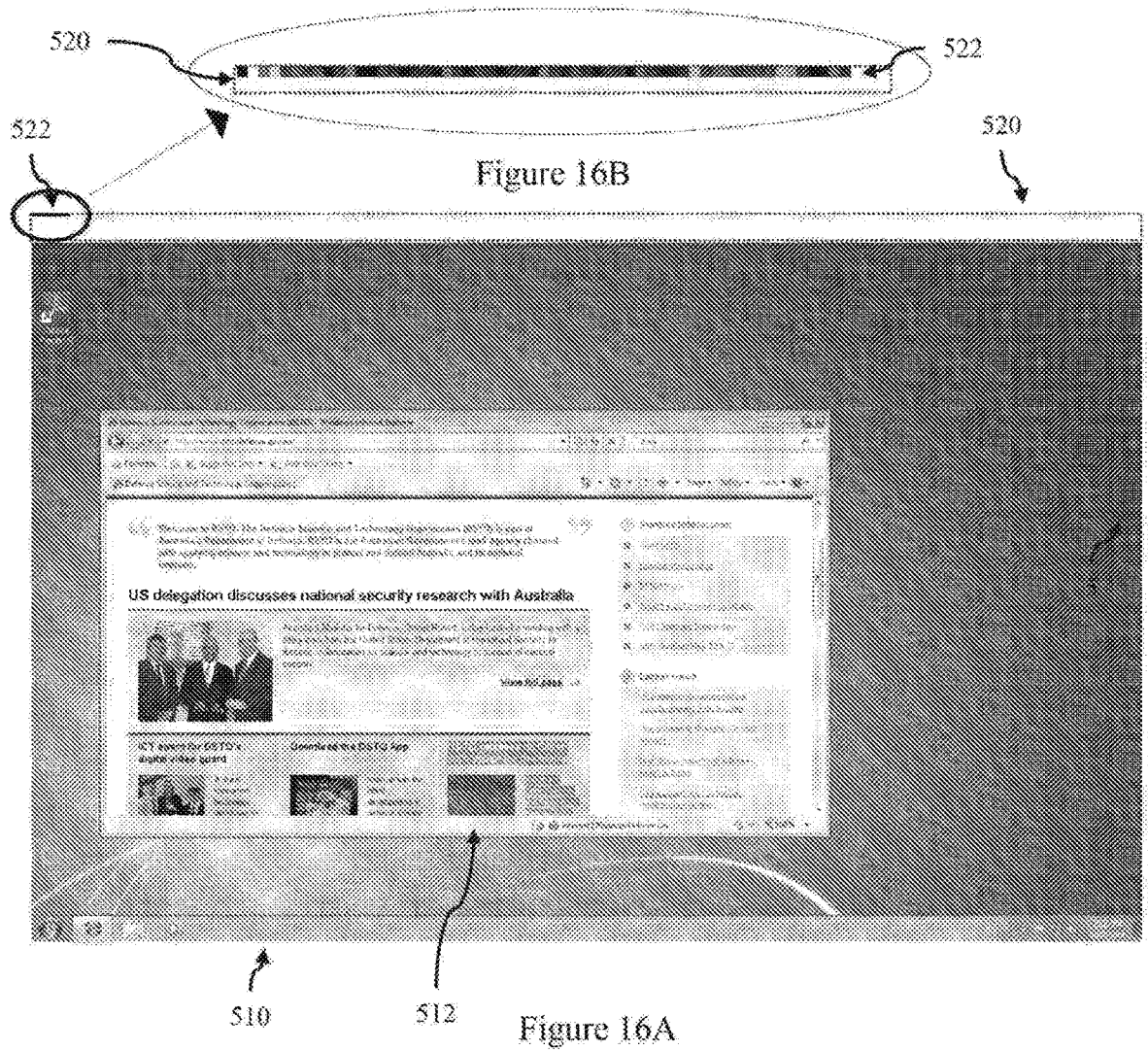
FIG. 16A is a displayed desktop environment for a domain comprising a reserved portion used to communicate information to the CDDC, in-band.
FIG. 16B displays a close up of the in-band information in reserved portion of FIG. 16B

In an embodiment, the software takes sole control of a reserved portion 520, such as the top portion, of the displayed desktop environment for each domain 510, for examples the top 40 lines of the screen. In this location or reserved portion 520 the software uses a drawing canvas to send information, in-band within the digital display data to the CDDC. The information to be sent is encoded into pixel values—basically being drawn on the screen. Other desktop environment graphical elements are prevented from being located in this reserved portion (or area), preventing the in-band information being obscured by other windows. This is illustrated in FIGS. 16A and 16B. FIG. 16A is a displayed desktop environment for a domain comprising a reserved portion used to communicate information to the CDDC, in-band, and FIG. 16B displays a close up of the in-band information 522 in reserved portion 520 of FIG. 16B. A portion of the canvas (occupying the reserved portion 520) is used to communicate the information and a close-up of the in-band information 522 is shown, this is the actual digital display data received by the CDDC from a particular domain. As is pictorially represented a small portion of the data (information) within the total data available reserved portion 520 contains an in-band window identification protocol 522.

In a preferred embodiment, the CDDC uses the same topmost portion of the composited desktop environment to display a domain banner 420, indicating to the user the currently active domain. This provides a clean user interface where none of the in-band window positioning information 522 is shown in the output composition generated by the CDDC. Preferably each display either uses the same sized reserved portion 520, or to take into account different resolutions between different domains, occupies an identical sized region in the output composition generated by the CDDC (ie the composited digital display data) which is wholly contained within or identical in size to the domain banner 420.

In a preferred embodiment, the domain-side software also hides the locally generated cursor using a customised no cursor theme. Hiding this cursor prevents multiple cursors being displayed from the multiple domains, and allows the user to operate and interact through the CDDC using only the CDDC on-screen display rendered cursor. The position and rendering of this on-screen display cursor is trusted by a user.

In some embodiments, the domain-side software can send through the bitmap of the current cursor shape to the CDDC using the same in-band communications mechanism. This cursor information can be used to allow the on-screen display cursor to be rendered a specific shape when interacting with windows from a particular domain.

In one embodiment, a packet-based protocol for delivering in-band information to the CDDC consists of a header (identifier, length, count, CRC check, type) and data (graphical region information) section. These packets, encoded as raw pixel data are displayed on the desktop environment for each independent domain, typically in the domain banner region to communicate in-band with the CDDC. Software is continuously monitoring the size and position of graphical elements in the desktop environment and updating the displayed protocol data immediately. Multiple packets can be combined, drawn and displayed by the domain-side software at the same time.

In some embodiments using digital display interfaces, the displayed frame is updated for the CDDC at a frequency of 60 Hz. The CDDC extracts the in-band information in real-time and is able to composite and decorate the identified graphical regions during the same displayed frame.

High Level Hardware Description

In a preferred embodiment, the CDDC is an entirely hardware-based device. The composition, on-screen display content, trusted keyboard and mouse handling, and domain switching are all handled by dedicated hardware components. The use of dedicated hardware makes the composited output and the operation of the device inherently more trustworthy than a software-based solution. A hardware-based solution allows greater physical isolation to be maintained between components than in a device relying on software-based isolation. This is very important for both non-interference and confidentiality guarantees in a multi-level secure user interface.

The hardware-based solution is not vulnerable to malicious software attacks and is more amenable to accreditation for high-assurance environments.

FIG. 12A shows an embodiment of the CDDC, a device that accepts three digital display inputs from three independent domains, composites the data from these three domains, including adding window decorations, on-screen display content and rendering the cursor, and outputs the data to a trusted digital display. Unidirectional forcing components on the digital display inputs prevent data leakage back to individual domains. A trusted keyboard device has its input switched (in a mutually exclusive manner) by the compositor between one of the three domains. A trusted mouse input is used by the compositor to drive the on-screen display of a cursor. The position of this cursor is also exclusively switched by the compositor between the three domains.

Figure 9A:
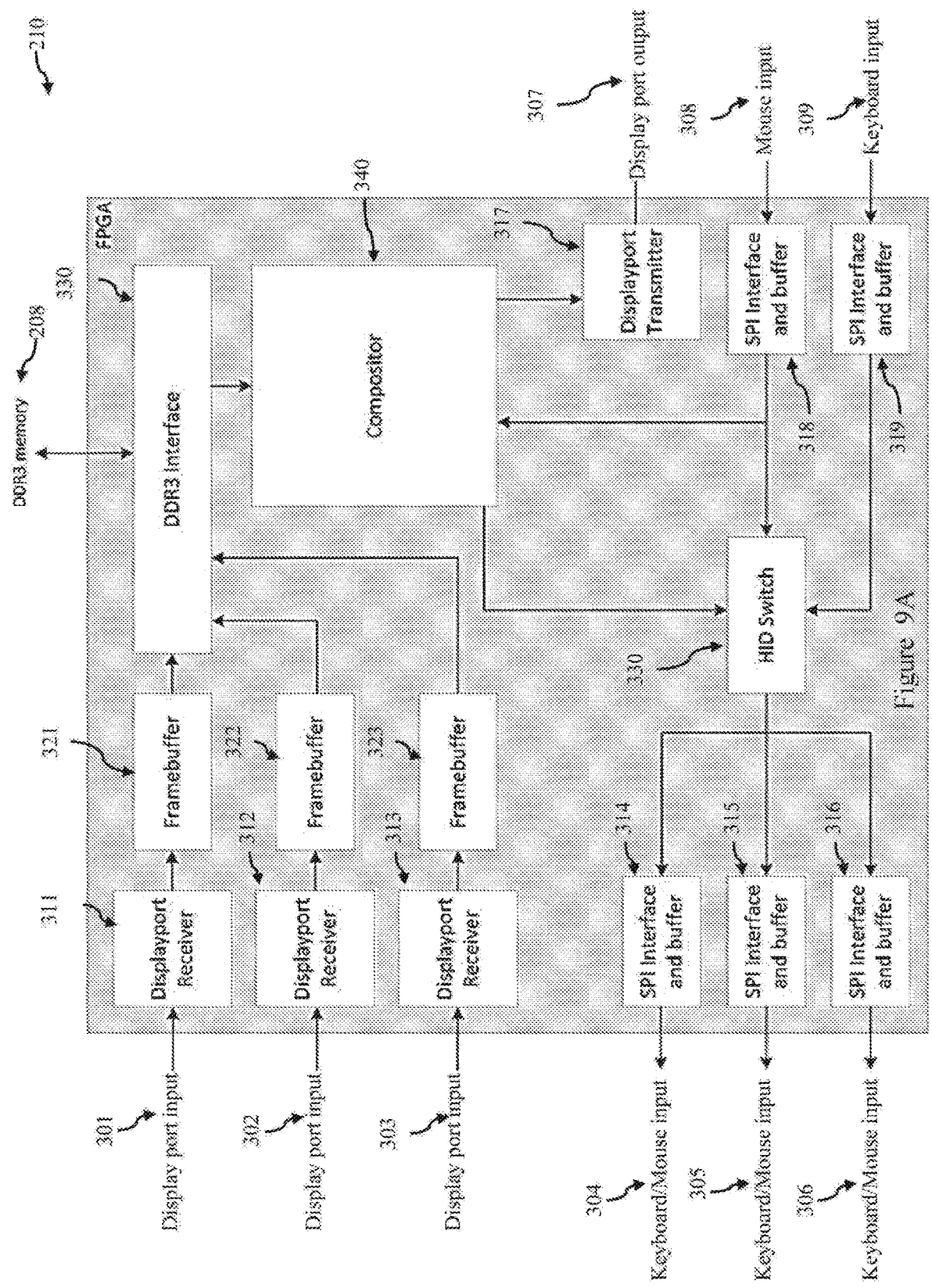
FIG. 9A depicts a simplified block diagram of a further embodiment.
Figure 9B:
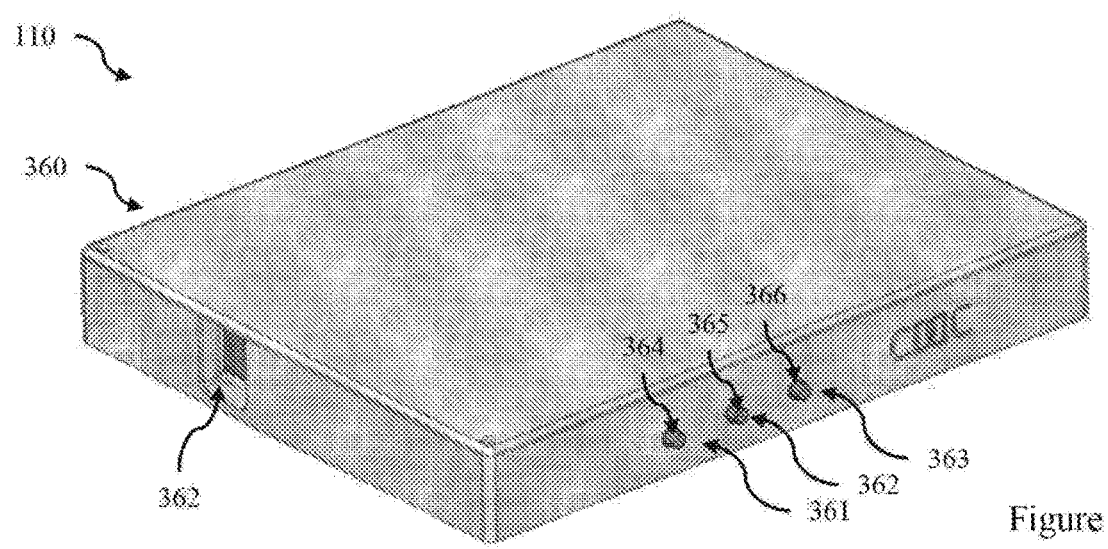
FIG. 9B a is a first view of an embodiment of a CDDC.
Figure 9C:
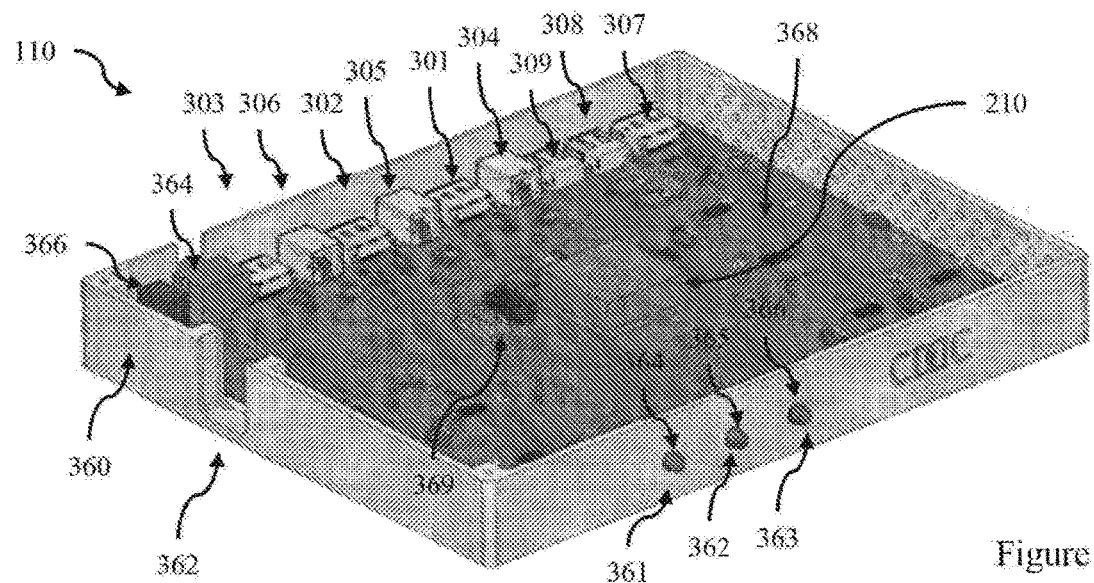
FIG. 9C is a second view of an embodiment of a CDDC.
Figure 9D:
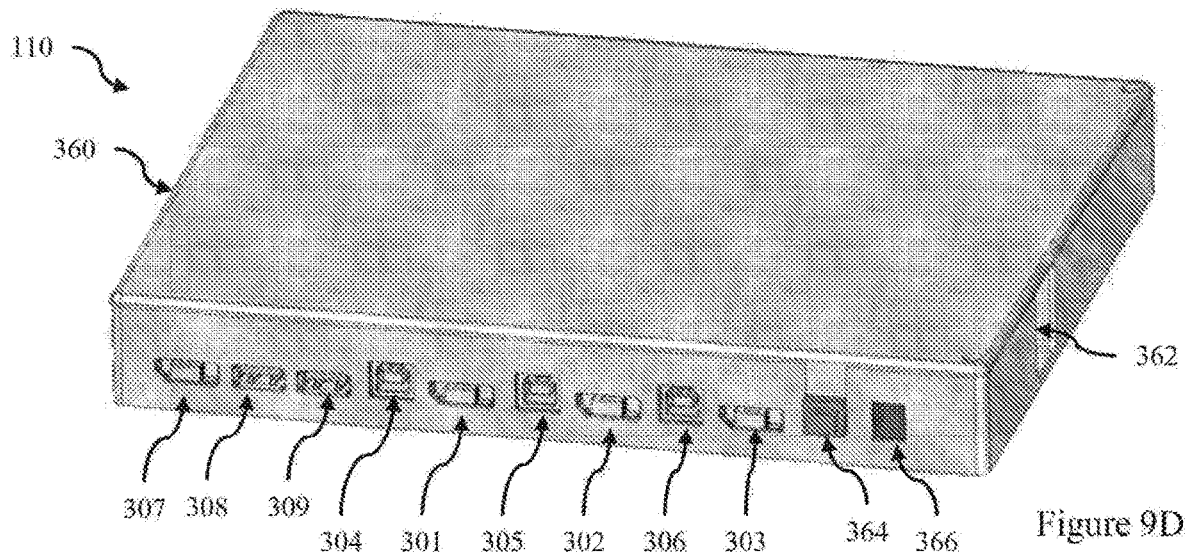
FIG. 9D is a third view of an embodiment of a CDDC.

FIGS. 9B to 9D shows three views of physical embodiment of the CDDC 110. In this embodiment the CDDC 110 comprises a housing 360 with a power socket 362, a power button 364 and a power indicator 366. The CDDC also comprises three displayport inputs 301 302 303 and outputs the composition from three domains on a displayport output 307. Three physical buttons 361 362 363 on the front of the housing can control, switching of the active domain. The three physical buttons 361 362 363 also each incorporate a light emitting diode, 364 365 366 providing a further trusted indication of the currently active domain (ie a domain indicator 203). Separate USB type B peripheral interface ports 304 305 306 exist to connect to each domain. Two separate USB type A interface ports exist for connecting a trusted keyboard 309 and trusted pointing device 308 to the CDDC. FIG. 9C shows an internal view with, the top half of the housing removed showing circuit board 368 with port connections, FPGA 210 and DDR3 socket 369 providing DDR interface 370.

Hardware Description, Block Diagram Level

Figure 17:
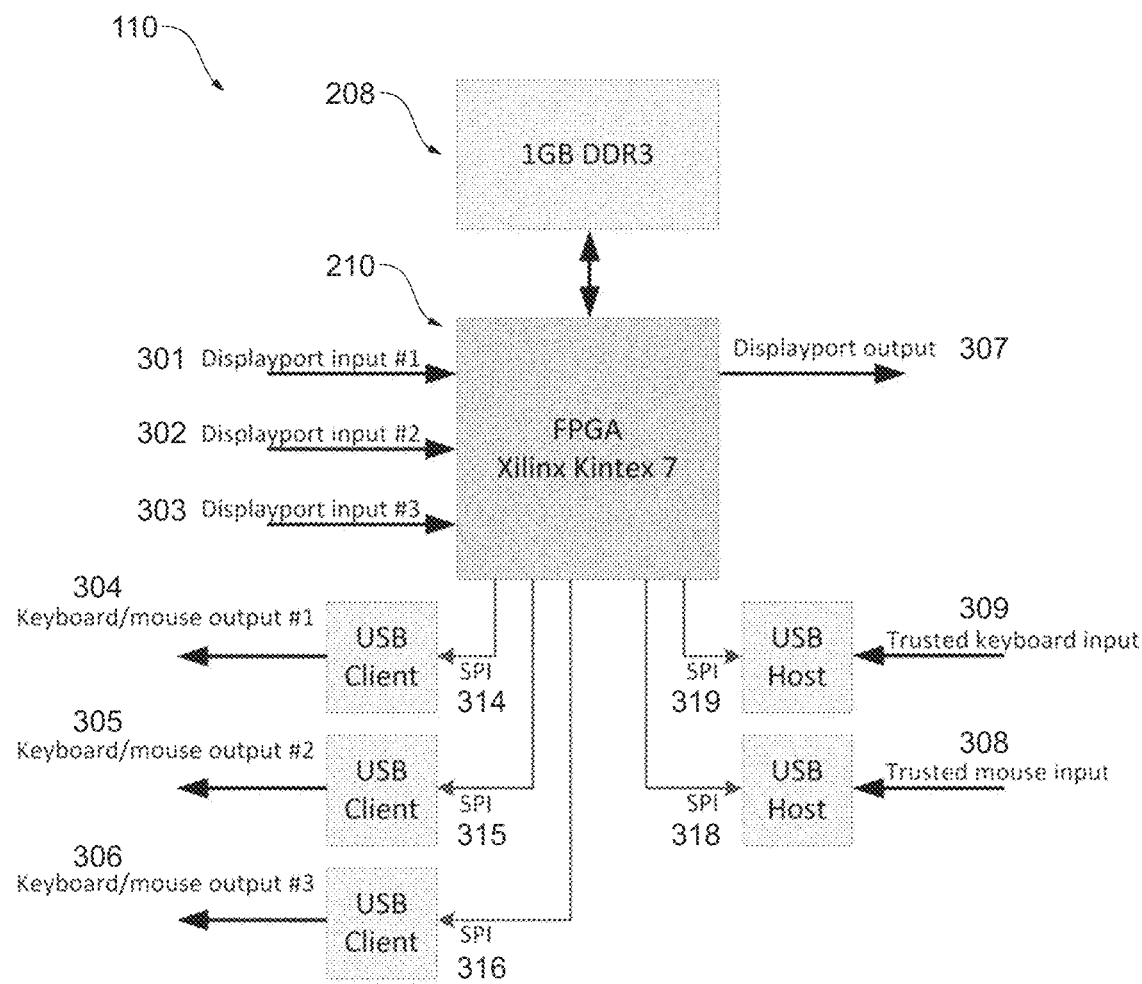
FIG. 17 depicts a functional block diagram of an embodiment.

In one embodiment the CDDC 110 takes the block form depicted in FIG. 17, which depicts a simplified block diagram of a further embodiment. Three physically isolated displayport inputs #1, #2 and #3 304 305 306 receive display data from three independent domains. In the embodiment described three domains are illustrated, but it is possible to have only two domains and also possible to have more than three domains the CDDC being of similar arrangement in each case as that described herein. The arrangement being seamlessly sealable.

One physically isolated displayport output 307 sends digital display data to a display device, e.g., a trusted monitor.

In a preferred embodiment, the resolution of the digital display data on the displayport inputs from each domain is identical. Further the resolution of the digital display data on the displayport output is also the same as the inputs. The same resolution simplifies composition by allowing pixel by pixel processing to occur over the same physical resolution for each domain. It also provides a more convenient interface whereby similar domains, operating similar software will produce identically sized desktop regions, for example task bars and desktop icons. The resulting composition is cognitively more intuitive to use.

Two Universal Serial Bus (USB) host proxy devices 308 309 are used to connect trusted input devices, such as a pointing device (typically a mouse) and a keyboard, for controlling the CDDC and interacting with the independent domains in a unified manner. The host proxy devices communicate via the USB standard communication protocol to the keyboard and mouse input devices. The keyboard and mouse inputs are then further communicated over a Serial Peripheral Interface (SPI) link 318 319 in a simplified format. The simplified format facilitates fast and secure switching of the input device data between domains.

Three USB client proxy devices are used to provide the keyboard and mouse inputs #1, #2, and #3 304 305 306 for each of the same three independent domains. The USB client proxies receive keyboard and mouse information over an SPI link 318 319 in a simplified format. The client proxies forward this information to the independent domains over the USB protocol. The client proxies are always active, but typically only receive data over the SPI link 314 315 316 when they are connected to the active domain.

The displayport inputs 301 302 303, displayport output 307, and SPI connections 304 305 306 314 315 316 308 309 318 319 for simplified keyboard and mouse data are directly connected to a Field Programmable Gate Array (FPGA) 210 of the Xilinx Kintex 7 type available from Xilinx Inc. but any suitable FPGA will suffice.

In some embodiments the FPGA is programmable by the CDDC product maker in a once only process and that they are not changeable after being programmed. FPGAs contain programmable logic components called "logic blocks", and a hierarchy of reconfigurable, interconnects that allow the blocks to be "wired together". Logic blocks can be configured to perform complex combinational functions, or merely simple logic gates like AND and XOR. In most FPGAs, the logic blocks also include memory elements, which may be simple flip-flops or more complete blocks of memory.

The FPGA has access to Random Access Memory in the form, in this embodiment of a 1 GB capacity double data rate type three synchronous dynamic random-access memory (DDR3) memory chip which makes use of the 64-bit wide data exchange route between the memory chip and the FPGA.

In this embodiment, the FPGA performs the majority of the functionality of the CDDC, including providing the digital display data output for a user to view on a monitor and directing the keyboard and mouse data described earlier via a respective USB client proxy if and only if the FPGA permits that transfer of data. That is, no data (mouse or keyboard) is received by any domain until the appropriate display characteristics are associated with the relevant regions of the digital display data. This characteristic in this embodiment being enforced by the trusted FPGA processes.

Hardware—FPGA Description, Exemplar Implementing CDDC

In one embodiment the CDDC functionality within the FPGA 210 takes the form depicted in FIG. 9A which depicts a simplified block diagram of a further embodiment. FIGS. 9B to 9D show various views of physical embodiment of a CDDC.

Three displayport inputs 301 302 303 receive digital display data from three independent domains via not displayed) one way data arrangements, e.g., isolation devices or arrangements (in software as well as hardware), or data diodes to physically and logically enforce unidirectional flows of information/data in the CDDC system. In this embodiment, each displayport receiver 311 312 313 physically enforces this uni-directionality of data flow through the configuration of the FPGA fabric.

In one embodiment the displayport inputs 301 302 303 and displayport output 307 use a Xilinx IP core to implement the displayport protocol. Three displayport receivers 311 312 313 and one displayport transmitter 317 are required.

To facilitate composition and compensate for timing differences between the digital display outputs of the independent domains, the digital display data streams (video streams) from each of the domains may be synchronised.

To synchronise the video streams from the independent domains, the digital display data from the displayport inputs are each directed to an independent framebuffer in the external DDR3 memory attached to the FPGA. In this embodiment this is a single memory component.

In a preferred embodiment, a physically separate memory component is provided for each independent domain frame buffer 321 322 323.

In one embodiment, a three-frame buffer was used for each independent digital display data stream, implementing a circular array of frames and preventing frame contention utilising the well-known video buffering primitives of either skipping a frame or repeating a frame. Once buffered, the foremost frame from each digital display data stream could be read out and processed concurrently by the remainder of the FPGA logic, implementing the desired CDDC functionality, including window identification, composition, and decoration.

In FIG. 9A the FPGA has access to the DDR3 memory 208 via DDR interface 330 so that it can be processing data received from each domain (e.g. the graphical representation of a desktop) for identification of predetermined portions of the display data including the application data and other data within a desktop display generated by the domain server or computer device on the domain. Depending on the domain, as described elsewhere in this specification various forms of decoration are added to the window of a particular domain and depending on which domain is presented as being useable to the user, the FPGA is programmed to compose the various windows of all the relevant domains and prepare the display for the monitor for the display port transmitted as display port output to the monitor direct from the FPGA for the user to view.

The user is provided trusted input devices, such as a pointing device (typically a mouse) and a keyboard, (not shown in FIG. 9A) which provide digital data into the FPGA via dedicated SPI ports 308 309 for receiving in this embodiment, USB standard communication protocol usable for connection, communication and providing power between computer devices and peripheral devices, such as a mouse and a keyboard. Both these devices communicate data, in the case of the mouse data representative of the movement of the mouse and variability of one or more controls on the mouse (such as for example the mouse wheel), and in the case of the keyboard, data representative of key strokes. The data is received by the FPGA at an SPI interface and buffer 318 319 to a USB host, which is within the FPGA. The data output of those buffers are directed through a Human Interface Device (HID) switch 310 the setting of which is controlled by the FPGA. In a preferred embodiment, the switch is configured to only allow one domain to receive the data, from the mouse and keyboard, at a time. Furthermore, but not depicted are one way data devices that allow the data generated by the peripheral devices to flow out of the FPGA but no data can flow into the FPGA from the domains via the SPI interface and buffer 314 315 316 located between the HID switch output 330 and the domains (ports 304 305 306).

With access to a frame of digital display data from each domain, the FPGA is able to create a composited digital display data output via compositor block 340. In one embodiment, the FPGA parses and operates on the input frame buffers pixel by pixel in a raster fashion from top left to bottom right, frames are processed and a new composite digital display data output frame created at the raw frame rate, typically 60 Hz for a digital display.

In one embodiment, the FPGA parses the pixel data for each domain to identify the in-band information within the digital display data. The location, size, and z-order of each identified region in the current frame is then extracted for each domain and stored separately within the FPGA. In one embodiment when the FPGA decodes the regions of interest it also stores a slightly larger region to represent the decoration border.

When generating the composited output, the FPGA determines whether to show domain pixel data or decoration data and from which domain to show it. The FPGA needs to be able to do this for each pixel in real-time, i.e., a single FPGA logic clock cycle. In some embodiments, pipe-lining may be used to break up the processing.

In one embodiment, the FPGA implements a fixed number of dedicated comparators to compare the location of the current pixel being processed with the location of the identified regions and identified decoration regions.

In an embodiment using a pipelined process in the FPGA, intermediate pixel values are created tone for each of the domains) to represent decoration of domain content. The FPGA computes the pixel value based on the stored region and decoration region information. This selectively manipulates only the regions of interest from each domain and applies the decoration to each region of interest. Careful attention is paid to the z-order of identified regions within the domain, ensuring the foremost region's decoration takes priority in the layering. The decoration is applied by selectively choosing for each pixel location whether to display original domain content for an identified region, decoration content around an identified region, or no content otherwise represented by a transparent pixel value. In one embodiment, the decoration was a 3 pixel wide coloured border. A representation of this intermediate step is shown in FIG. 12D in which an undecorated display portion 440 comprising a taskbar 441 and window 442 have respective borders 443 and 444 applied generating a composite display 400.

The intermediate values are then combined, together and a single pixel value chosen to be representative of the composited content. The chosen pixel value is dependent on the ordering of domains. In a preferred embodiment, preference is given to the intermediate values from the foremost domains first.

The FPGA maintains an ordering of domains, the foremost domain is the active domain, the second foremost domain was the last active domain and so forth.

To facilitate composition and layering, where a transparent pixel value is encountered, the next foremost domain content is chosen for the pixel value allowing the composite output from different domains to be created, a representation of this intermediate step is shown in FIG. 11.

Once a composited pixel value is created from domain and decoration content, the FPGA adds the on-screen display content in a further pipeline processing step.

In one embodiment, a banner 420 is rendered at the top of the composited output, covering all pixels in the first 40 lines of the output. This banner 420 achieves a couple of objectives: it covers the area used by the domains to transmit in-band information; and, through the colour and some rendered text it uniquely identifies the currently active domain. Importantly no domain-generated content can ever exist in this area it is trusted to be under the complete control of the CDDC.

In the final step, the FPGA renders the cursor 460. The CDDC controls the position of the cursor based on input from the trusted mouse input. When processing the pixels in the vicinity of the cursor location, the FPGA selectively chooses to draw cursor content. In one embodiment, cursor content is a bitmap stored in the FPGA of a familiar desktop arrow. In one embodiment, the shape of the cursor may be influenced by cursor information received from the untrusted independent domains. In this embodiment the cursor shape would only be displayed while the particular domain is active, and the cursor is currently positioned over content associated with the active domain.

For parts of the display that have transparent content from all domains, i.e., no regions of interest, the FPGA can do a number of things: render its own background colour, e.g., the colour of the active domain decoration; or, render the actual background of the active domain. In one embodiment, the background of the active domain is rendered, but it is greyed out. In a preferred embodiment, none of the content from the intermediate steps exists for longer than a few FPGA logic clock cycles; even the final composited digital display data output is only lightly buffered before being transmitted out the displayport interface.

Various methods are used to switch the active domain. In one embodiment, using the stored region and decoration information, every time the left mouse button is clicked, the FPGA hardware checks the location of the click. If the cursor is currently over content or decoration displayed from a domain other than the currently active domain then the FPGA updates the ordering of the domains such that the clicked-on domain becomes the active domain and the other domains are shifted down the order.

In one embodiment, in the on-screen display composition step, the FPGA renders some bask buttons 470 in the top right of the screen as shown in FIGS. 10A-10C and 11. These buttons represent each of the domains. If a left mouse button click occurs whilst the cursor is located over any one these buttons, then the active domain is updated to coincide with the domain represented by the button.

In some embodiments, the CDDC also has physical buttons on the housing (eg front face) that allow a user to switch the active domain. An indicator such as a LED located, on the housing may indicate which domain is active. This my be integrated with the physical button or located adjacent the button.

The mouse is the only element which can cross the trust boundary between multiple domains. Mouse movements are interpreted and stored by the CDDC within the FPGA. The FPGA implements in reconfigurable logic, an absolute positioning driver for the mouse, storing the current position of the mouse cursor and confining it to be mapped over the resolution of the digital display data output. The FPGA also receives all button press and scroll wheel information from the attached mouse see FIGS. 8 and 9.

The calculated absolute mouse position and other raw mouse events are buffered by the FPGA for delivery to the appropriate domain.

The keyboard keystrokes are buffered by the FPGA for delivery to the appropriate domain see FIGS. 8 and 9.

In one embodiment, the USB HID client proxy implements a composite keyboard/mouse HID device. In one embodiment it is a Cypress PSoC IC that has an SPI input from the FPGA and a USB output to a single domain. When plugged into a domain it maintains a continuous connection.

The FPGA switches the buffered keyboard and mouse data between the USB client proxies connected to the independent domains. This switching occurs as the active domain is updated.

The FPGA ensures that all keyboard and mouse information received and stored before a switch occurs is delivered to the active domain at the time the switch occurred. Further it ensures all keyboard and mouse information received and stored after a switch occurs is delivered to any newly active domain.

In one embodiment power to the keyboard can be removed during domain switch to mitigate some transient storage covert channels that might exist within keyboard peripheral devices.

The USB client proxy connected to the active domain receives the keyboard and mouse data over its SPI link and reports this to the domain. The other USB proxies receive no data and send no updated keyboard or mouse information to the domain. Importantly the domains are unaware of being connected or disconnected to the CDDC keyboard and mouse data stream, instead it just appears as if the mouse has stopped being moved and the keyboard is not being typed on.

Seamless mouse switching is achieved by the proxy implementing an absolute positioning device type mouse. This prevents any synchronization issues as the mouse is switched between domains, i.e., the cursor does not pick up from where it last left a domain, instead it is directed to where the cursor position maintained by the CDDC is located.

Security Policy Management

The security policy of the CDDC dictates how it will operate with the digital display data and, the Human Interface Device data received. This includes: controlling the decorations (colour, width, on/off, etc.); controlling which domains are shown; controlling which domains can be active; and controlling which domains cannot receive keyboard input (e.g., read-only/view-only domains).

The security policy of the CDDC can be configured in a number of manners. Policy is stored in and implemented by the CDDC. Some examples include: the policy updated at build time and stored in non-volatile memory within the CDDC, only providing a static CDDC configuration for a particular environment; updated by an administrator through a separate administrator interface on the CDDC; or provided for the CDDC on a removable media device, e.g. smart card.

Applications and Use Cases

A typical use case for the CDDC is for combining and accessing independent computing domains from a single unified user interface in a secure manner.

Independent isolated domains exist in many industries and could benefit from having a secure unified desktop interface. Examples include: combining different security classification domains in a defence environment; combining proprietary data source environments with less trusted Internet facing environments in the commercial world, e.g., combining sensitive fiscal data processing with Internet browsing in a financial institution; and combining SCADA, interfaces with Internet facing domains in an industrial environment.

Further the CDDC can be used for customised applications, where for example the domains are aware of the CDDC's capabilities. For example, the CDDC may be used to combine or fuse overlapping visual information from multiple domains into a new output. In this manner for instance content or graphs from isolated domains could be overlayed and viewed simultaneously without compromising the integrity of the data on any one domain. A more detailed example is provided later in this specification that demonstrates the creation of cross domain applications using the CDDC.

Extensions and Applications

There are many possibilities for extending the CDDC concept, and for implementing a specific incarnation. The ability to modify, augment, create, and move pixel content, combined with the ability to switch a Human Interface Device (HID) e.g., keyboard or mouse input, between multiple domains provides many opportunities for unique user interfaces and access cross domain solutions, with varying security policies in place and enforceable by the CDDC.

Given complete control over the composition and mouse/keyboard switching many different actions and security policies may be implemented by a CDDC, including:
  Greying out elements of non-active domains, but still being able to interact with those elements;
  Allowing the cursor to switch between domains as the cursor is moved within the monitor screen area;
  Interspersing domain windows in a natural order;
  Cursor information provided by a domain when the cursor is located over a window associated with that domain;
  Picture in Picture or split screen types of composition;
  Cursor operation when on undecorated content, e.g., send right mouse click to desktop of active domain;
  View-only/read-only domains that do not accept keyboard or mouse input; and,
  Repositioning of graphical elements in the composited output.

Managed Information Flows

Further extensions and improvements are possible when the CDDC's access cross domain capability is combined with or utilised to provide a transfer cross-domain capability as well. This provides the opportunity for many different applications.

In one embodiment, the CDDC can control information transfer between independent domains.

In one embodiment, using only the digital display data output from one domain and the Human Interface device input to another domain, the CDDC can transfer information. The transfer of this information would be managed by a security policy implemented within the FPGA logic. This security policy may impose restrictions on the information transferred, including but not limited to: bandwidth, content, directionality, originating domain, destination domain, timing, and format.

To one embodiment, where the CDDC is used in a typical desktop environment, secure "cut&paste" of information can be achieved between independent domains. In one embodiment, steps involved in this "cut&paste" include:
  Untrusted domain software on a first domain capturing a user's request to cut, or copy some information from their desktop computing environment.

Untrusted domain software on the first domain sending this information to the CDDC in-band within the digital display data, along-side the existing in-band identification information.

The CDDC recognising this information, storing this information, and applying a security policy to this information.

Untrusted domain software on a second domain capturing a user's request to paste information into their desktop environment.

Untrusted domain software on the second domain sending this request information to the CDDC in-band within the digital display data, along-side the existing in-band identification information.

The CDDC recognising this request information from the second domain.

The CDDC forwarding the stored and processed information received from the first domain to the second domain using the Human Interface Device (HID) input to the second domain.

Untrusted domain software on the second domain receiving the processed information and pasting it to the desktop environment.

The security policy on the CDDC can dictate if information flows are allowed between different domains.

In one embodiment, the information transferred might be some text or an image cut from a Microsoft Word application executing on a first domain and sent to a Microsoft Word application executing on a second domain.

Managed information flow can also occur separate to the CDDC operation. An example of this is to utilise commercially available data diodes to securely transfer information unidirectionally from one domain to another.

View Only Domains

An embodiment where the CDDC permits a certain domain to be view-only or read-only could be useful where that domain is used solely for monitoring. An example may be combining an Internet facing desktop environment with a SCADA system using the CDDC In this embodiment, the SCADA system cannot be controlled, or affected in any manner by the user of the composited system however the user is still able to monitor applications and processes executing on an isolated SCADA network and take actions as required.

Zero Client CDDC

The input to the CDDC could come from desktop computers, thin clients, workstations, servers, zero clients, or any other device capable of outputting digital display data.

In environments supporting access to independent computing domains there is often existing separate networking connections for each independent domain. The CDDC could be used to connect a desktop computer, or thin client to each of the network ports and appropriately configuring the domain software for each domain computer, and appropriately configuring the security policy of the CDDC.

A more convenient approach would be to combine zero-client, or ultra-thin client computing infrastructure within the CDDC architecture. The combined device would now:

attach to independent domains via network connectivity;

the zero-client, or ultra-thin-client computing infrastructure would execute a remote desktop connection to provide a desktop environment; domain software would ensure the desktop environment supported the in-band identification protocol; and the CDDC would provide a unified desktop through which a user can interact with the independent domains.

In one embodiment, the zero-client computing infrastructure could be implemented as a single integrated circuit, built as part of the CDDC hardware.

Integrated Composition

A further embodiment uses a method of integrating information from multiple isolated domains into a consistent graphical user interface, whereby a user can interact with the integrated interface as if it were a single cross domain application. Thus allowing a user's actions to seemingly straddle different (independent and isolated) domains.

This method can be used whenever a user has access to multiple isolated domains and would like a unified computing application to be seamlessly operated across all domains. For example, it can facilitate the existence of an email client that can integrate and render content from multiple domains in a single, integrated user interface.

A composited output region is generated that contains graphical elements from differing isolated domains. In this embodiment these graphical elements are not stand-alone elements, but are destined to form part of an integrated cross domain application. That is, they are specifically destined to be composited together with similar elements from other domains to forma true cross-domain application.

Human Interface Device (HID), e.g., keyboard and mouse input is switched depending on the context/focus of the cursor.

Whilst in this embodiment the composition and merging of content is done in hardware by the CDDC, it could equally be achieved, though with less security, with existing access cross domain solutions, like SecureView, Qubes OS, Nitpicker, or the Trusted Thin Client. In these cases instead of operating at the level of digital display data, the data would be operated on at the Operating Environments display manager level.

By way of example, a user can use an email client that is running on all the domains but have elements of selected client facing functions of those email clients, running on isolated domains, appear on the same screen and be operable from that same screen while keeping all the email elements from the separate email clients isolated from each other. See FIG. 19.

In a commercial environment, one domain may be the secure domain of researchers while another domain may be the publicly available domain of the company and the user in the secure domain who would not be able to send mail to or see mail on the public domain, they will with the embodiment of the compositor described, be able to use a single screen that displays email from both domains and allow that user to respond to an email from the public on the public domain while also being able to see their own email application within the secure domain. Further the user would be able to operate the secure email application from that same screen and know that it will be isolated from the public domain.

The user operating a cursor can activate which element of a domain that is to be active by placing the cursor over the displayed element and all cursor and keyboard activity is directed only to that domain and no other domain can access that activity or the elements of the email application being used—this functionality being provided by the previously described embodiments of the CDDC.

Arrangement of applications to execute in this environment relies on supporting software executing, on the independent domains to ensure that the graphical elements output will actually form into a coherent and unified application when composited by the CDDC as described in this specification.

In a simple embodiment, each independent domain has untrusted software programmed to output the graphical elements in predetermined positions. These predetermined positions are arranged such that the composited output forms a unified application, e.g., FIG. 19 shows three domains outputting email information in predetermined positions, which when combined together, visually form as unified email application.

More complex arrangements can be accommodated when the CDDC is aware of this application level compositing, and can actively participate in the visual construction of the unified cross domain applications.

In one embodiment, the CDDC is able to identify graphical elements from independent domains and then place these graphical elements in a different position in the displayed output. In this manner, the CDDC receives many graphical regions from multiple independent domains and through the application of a geometric policy (i.e., rearrangement of various graphical regions) is able to form a unified visual output, implementing a cross domain application.

Human Interface Device inputs, (e.g., keyboard and mouse) are still directed to the appropriate originating domain for each of the graphical elements used to construct the compos ted application.

To support rearrangement of graphical regions from different domains, in one embodiment the CDDC implements a frame-buffer for the output data to be displayed.

In some embodiments, domain outputs no longer need to conform to standard desktop environments, instead the content to be composited can be placed anywhere and even communicated in-band within the digital display data stream. An example might be where all a domain outputs is the in-band positioning information, followed by a number of rectangular regions that are destined to form part of the unified cross domain application. The remainder of the output can be blank.

In some embodiments, the CDDC performs translation of hardware cursor location to a known domain perspective, particularly when regions have been translated in position. In some embodiments the cursor information returned may be relative to a known graphical element in a domain instead of an absolute position.

Where software solutions (e.g., Qubes OS, or Nitpicker) are used for this application level compositing, graphical information can be passed in any of a number of formats and through any available communications protocol. For example the information could be sent as binary compressed data over web sockets.

In some embodiments, to further support these composited cross domain applications, the CDDC, or other, can support the notion of multi-level mouse events. In one embodiment, the CDDC can render to a portion of the output, using on-screen display content. When a mouse click is detected over this content it can be sent to all domains. This mechanism could be used to control and synchronise the operation of the cross domain applications.

Combining managed information flow (using either the CDDC or external data diodes as previously described in this specification) with the cross domain application level compositing can be used to construct more useful applications. An example is illustrated below through the ability to forward an email received on a first independent domain to another user on a second independent domain.

Figure 18:
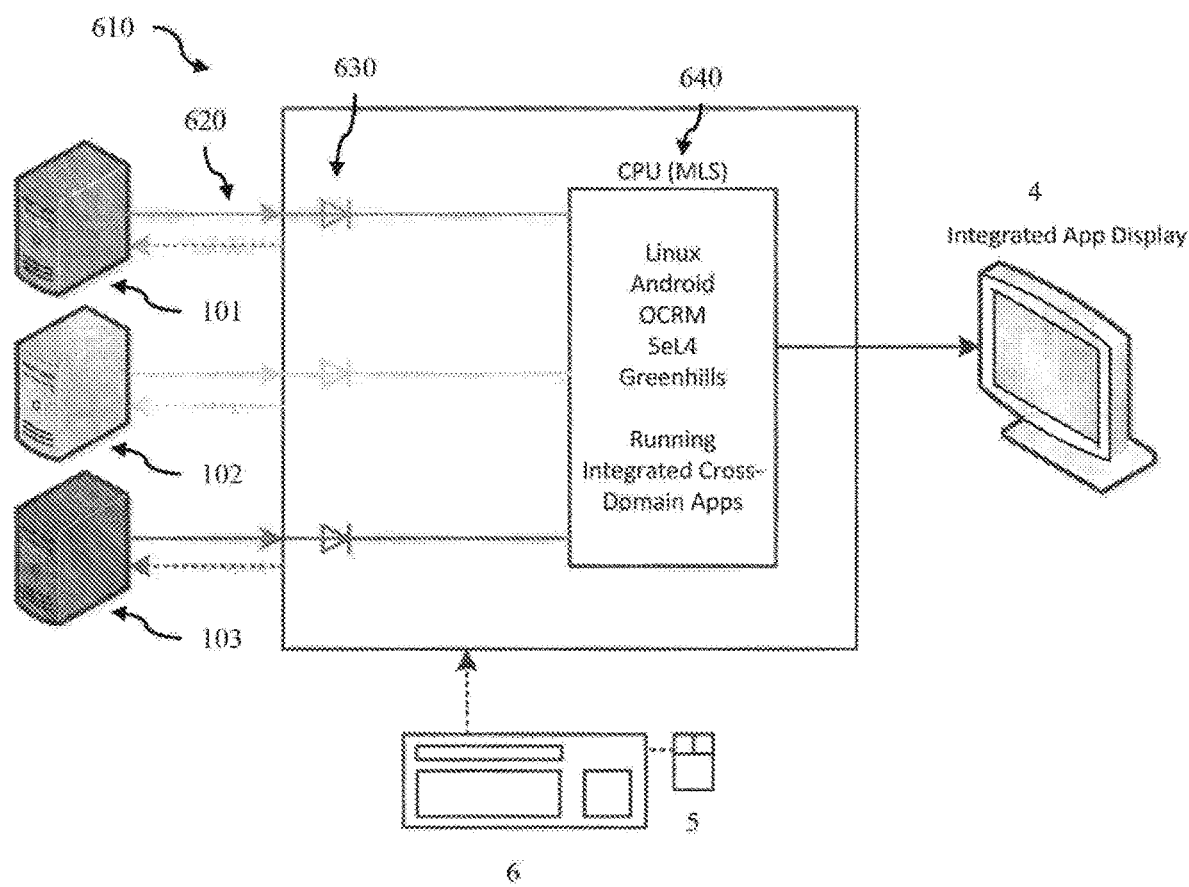
FIG. 18 depicts a configuration that uses a trustworthy separation kernel to implement some of the desired functionality according to an embodiment.

FIG. 18 is illustrative of a hardware arrangement 600 supporting the method using a separation kernel approach in which a CPU 640 performs the compositing method. Other support arrangements could also be used. Domain information 620 from domains 101 102 101 is sent via diodes 630 where the Diode symbols 630 shown in the figure are hardware or software data diodes but are not part of the compositing method but are part of the assumed isolated domains environment described earlier in this specification.

Figure 19A:
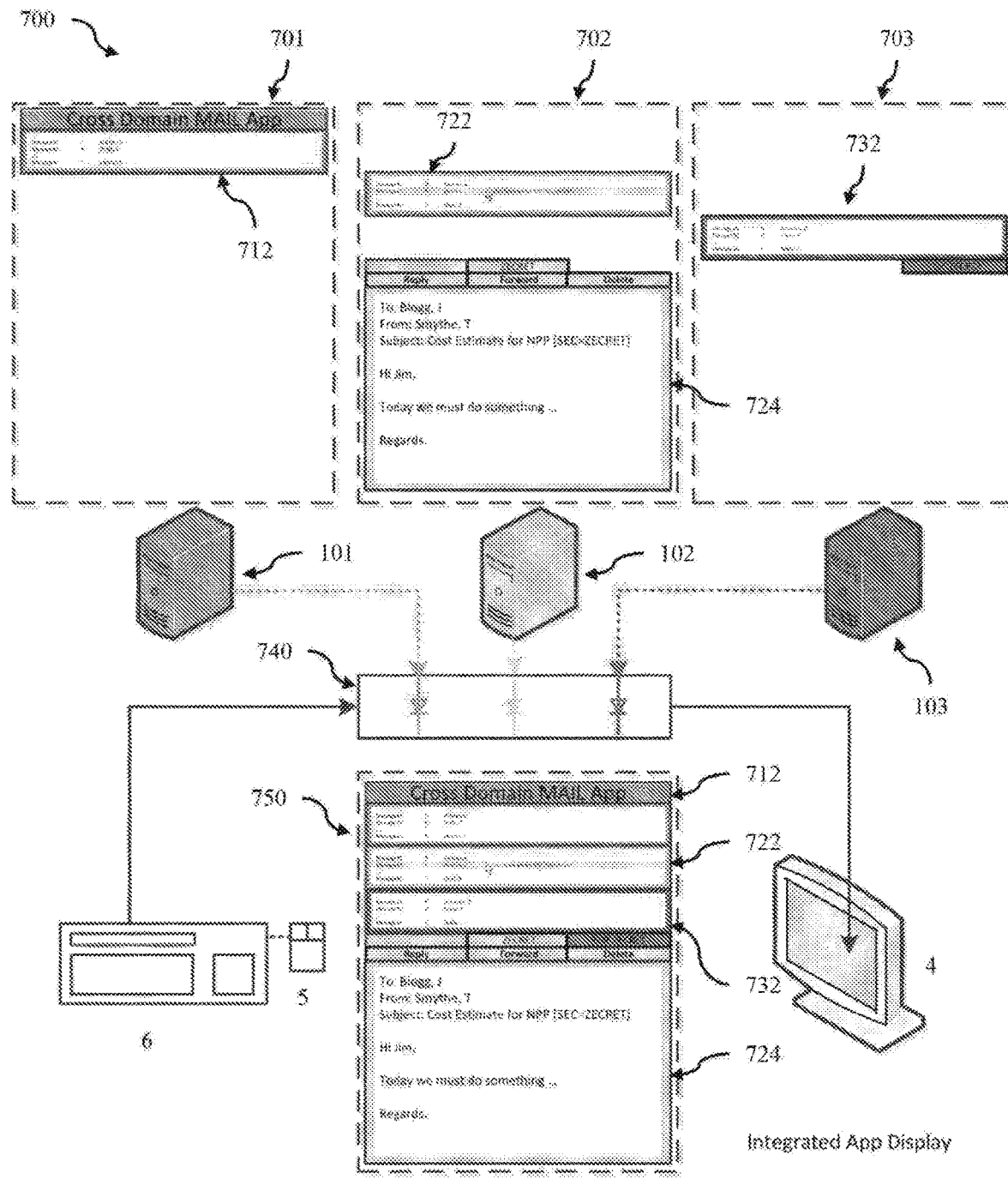
FIG. 19A depicts a semen with an email application providing emails from all the isolated domains on the one screen, so although those email are from the relevant domains A, B and C the users views them in the same screen and uses them as though they were in the same application.
Figure 19B:
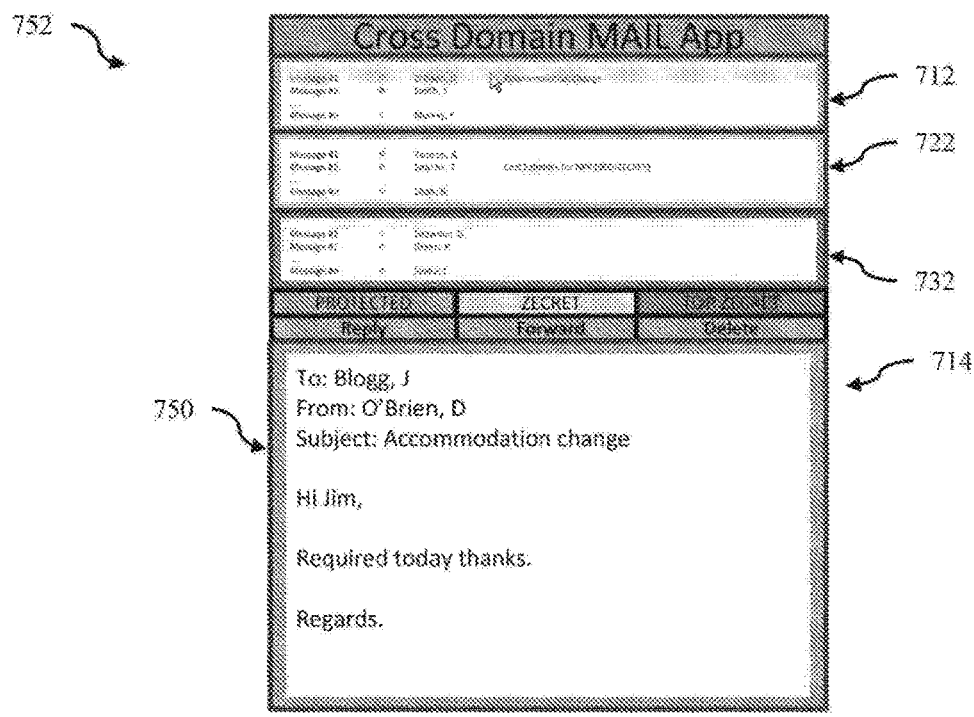
FIG. 19B shows a second off cross domain email application being constructed from simple display blocks composited from the various domains according to an embodiment.
Figure 20:
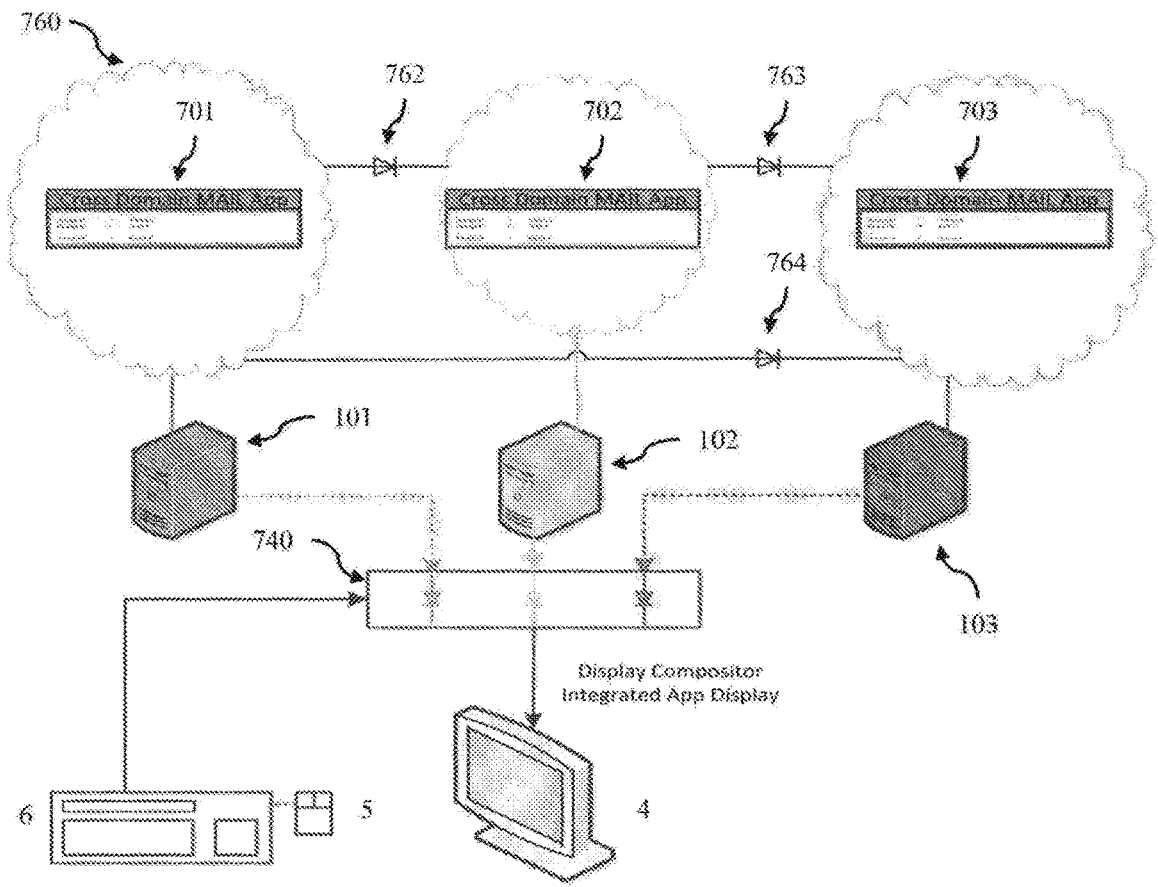
FIG. 20 depicts the architecture of cross-domain email application that allows the forwarding/replying of emails from one level to a higher level.

A method to forward/reply to email in another domain (such as those higher in an applied hierarchy) is illustrated by FIGS. 19 and 20 which are illustrative of that functionality but does not show how exactly that is achieved.

In one embodiment, the domains are responsible for coordinating forward/replies to higher level domains and this is done using untrusted software functionality that resides outside the CDDC.

FIG. 19A shows three domains 101 102 103 each running an email client 701 702 703 comprising email windows 712, 722 724 and 732. FIG. 19A shows screen 750 (at the lower portion of the figure) with an email application providing entails 712, 722 724 and 732 from all the isolated domains 101 102 103 on the one screen, so although those email are from the relevant domains the users views them all in the same screen and uses them as though they were in the same application. Again the diode symbols in CDDC 740 are illustrative of the isolation mechanism ensuring that the domains remain isolated. The keyboard 6 and mouse 5 as shown communicating with the CDDC configuration 740 operating as described in this specification as is the monitor 4. FIG. 19B shows a second view 752 of the screen 750 according to an embodiment with an email 714 from the first PROTECTED domain 701.

FIG. 20 depicts the architecture 760 of cross-domain email application that allows the forwarding/replying of emails from one level to a higher level external of the CDDC. The flow is always from a lower level in the hierarchy to a higher level but not the other way, as again enforced by the use of data diodes 762 763 764 or their equivalent.

Figure 21A:
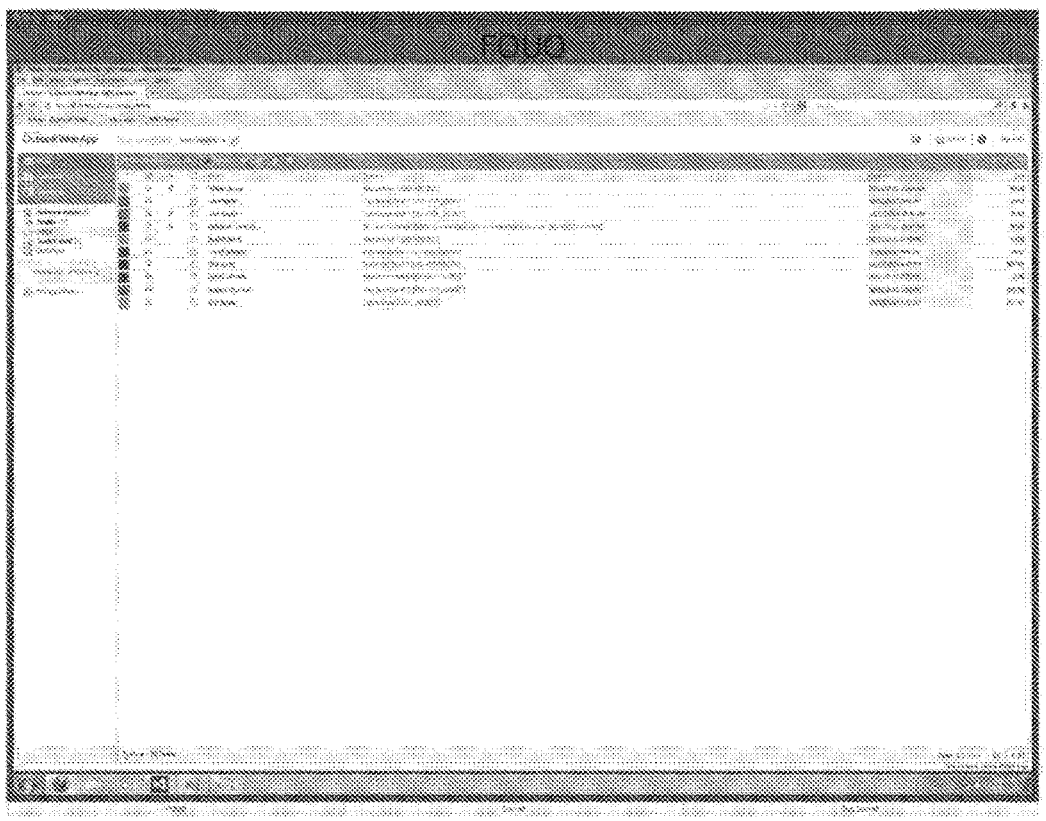
FIG. 21A shows a first view of an example of a combined email screen showing email from each of the isolated domains on the same screen as if they were in the same email application.
Figure 21B:
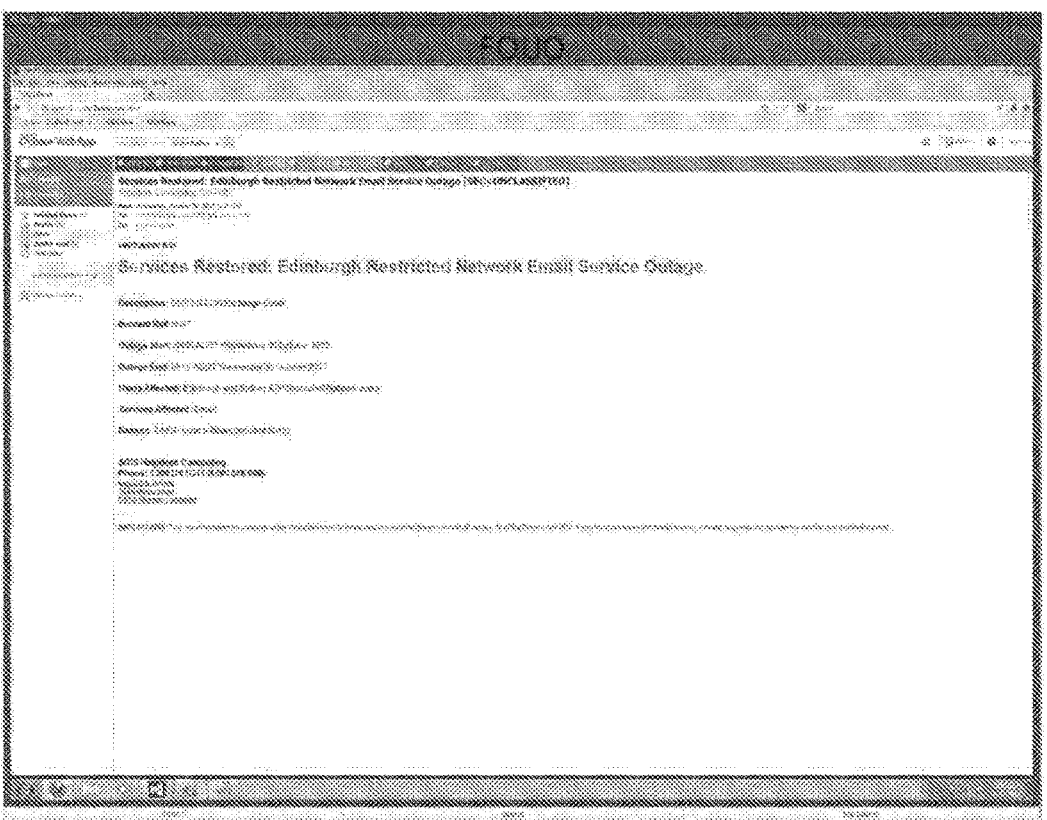
FIG. 21B shows a second view of an example of a combined email screen showing an email from each of the isolated domains on the same screen as if they were in the same email application.

The FIG. 21A is a screenshot of an email application providing emails from all the isolated domains on that one application screen, so although those email are from the relevant domains 701, 702 and 703 the users sees them all in the same screen and uses them as though they were on the same application, when in fact they are all on different isolated domains. FIG. 21B shows a second view of the integrated email application displaying an email from the FOUO domain according to an embodiment.

The invention claimed is:

1. A secure digital display data compositor apparatus for simultaneous display of streams of different classes of display data on a digital data display, each stream corresponding to a graphical user interface for a unique independent hardware computing domain, comprising:

a plurality of digital display data input interfaces for receiving digital display data, each interface coupled to a single different independent hardware computing domain;

a digital display data compositor configured to:

continuously identify predetermined updateable regions of the digital display data for each independent hardware computing domain corresponding to graphical elements of the respective domain graphical user interface, each predetermined updateable region comprising a window, the windows having a user changeable layering order and each window having a user changeable size and position, by identifying an in-band signal within pixel values of the digital display data received from each independent hardware computing domain, and each respective in-band signal defines regions of the digital display data corresponding to graphical elements of the graphical user interface from the respective independent hardware computing domain, and each respective in-band signal identifies a layering order of the graphical elements of the graphical user interface for each of the respective independent hardware computing domains;

associate a predetermined display characteristic with each identified region according to a predetermined security policy;

define an overall user changeable layering order on the identified regions and associated graphical elements and display characteristics from all the independent hardware computing domains, wherein the overall user changeable layering order determines an active window;

composite, according to the defined overall user changeable layering order, the identified regions and associated graphical elements and display characteristics from each of the independent hardware computing domains into a single digital display data stream, wherein the identified regions and associated graphical elements and display characteristics from each independent hardware computing domain are visually combined in an overlapping manner representing a single unified graphical user interface across all independent hardware computing domains;

wherein the predetermined display characteristic corresponding to the active window is displayed in a predetermined region of the single unified graphical user interface;

a digital display output interface for outputting the composited digital display data stream on the digital data display.

2. The secure digital display data compositor apparatus of claim 1, further comprising a video processing function that associates an output display characteristic with the composited digital display data set.

3. The secure digital display data compositor apparatus of claim 2, further comprising:
at least one peripheral interface for receiving peripheral device data input indicating use of a peripheral by a user;
a plurality of peripheral interfaces for transmitting peripheral device input data to the independent computing domains, each of which configured to connect to at most one unique independent computing domain, and
a switching component for directing peripheral input received by the at least one peripheral interface that receives peripheral device data, to the peripheral interfaces for transmitting peripheral device input data according to the predetermined security policy.

4. The secure digital display data compositor apparatus of claim 3, wherein at any instant in time, each of the at least one peripheral interface is associated with one of the independent computing domains designated the active domain.

5. The secure digital display data compositor apparatus of claim 2, wherein an output display characteristic of the video processing function is further configured to generate a domain banner that cannot be modified by any of the independent computing domains that at least indicates which of the independent computing domains is the active domain.

6. The secure digital display data compositor apparatus of claim 2, wherein an output display characteristic of the video processing function is further configured to generate virtual visual elements, being one or more of the group; desktop icons, drop down lists, buttons, banner, regions of colour or patterns, lines, shapes, cursor, background colour or pattern of a region of the display, for positioning over the composite.

7. The secure digital display data compositor apparatus of claim 3, wherein at any instant in time, each of the at least one peripheral interface is associated with one of the independent computing domains designated the active domain, and the active domain can be changed by clicking on a viewable region associated with one of the other independent computing domains from another in the composited desktop environment output.

8. The secure digital display data compositor apparatus of claim 3, wherein at least one peripheral interface comprises a USB interface.

9. The secure digital display data compositor apparatus of claim 1, wherein all regions associated with each independent computing domain share the same predetermined display characteristic.

10. The secure digital display data compositor apparatus of claim 9, wherein the predetermined display characteristic comprises a coloured border around the region.

11. The secure digital display data compositor apparatus of claim 1, wherein the digital display data compositor is configured to encode the in-band signal to display in an unobservable form.

12. The secure digital display data compositor apparatus of claim 1, wherein each digital data stream from each independent computing domain comprises a reserved portion which comprises the in-band signal and in which all predetermined regions are excluded, and the reserved portion for each independent computing domain occupies an identical region in the composited digital display data.

13. The secure digital display data compositor apparatus of claim 10, wherein the digital display data compositor is configured to use the identical region in the composited digital display data to display a domain banner that cannot be modified by any of the independent computing domains that at least indicates which of the independent computing domains is the currently active domain.

14. The secure digital display data compositor apparatus of claim 10, where in-band portion further comprises cursor information comprising at least a shape for the respective independent computing domain, and when interacting with regions associated with the respective domain the secure digital display data compositor is configured to render an onscreen display cursor based on the cursor information for the respective domain.

15. The secure digital display data compositor apparatus of claim 1, wherein all regions associated with the same independent computing domain share the same order.

16. The secure digital display data compositor apparatus of claim 1, wherein the digital display data compositor is a Field Programmable Gate Array (FPGA) which is not changeable after programming.

17. The secure digital display data compositor apparatus of claim 14, further comprising a random access memory in communication with the FPGA.

18. The secure digital display data compositor apparatus of claim 1, further comprising a pointing device the output, in the form of a symbol, is rendered and located over the composited digital display data and associated with an identified region of the composited digital display data of one of the independent computing domains by identifying a respective in-band signal in the digital data from each independent computing domain.

19. The secure digital display data compositor apparatus of claim 1, wherein the digital display data compositor integrates multiple compositions from multiple domains according to a predetermined geometric policy.

20. The secure digital display data compositor apparatus of claim 3, wherein the switching component for directing peripheral input received by the at least one peripheral interface that receives peripheral device data broadcasts to two or more independent computing domains selected received peripheral input of predetermined actions.

21. A method for secure digital display data composition by a digital display data compositor to allow simultaneous display of streams of different classes of display data on a digital data display, each stream corresponding to a graphical user interface for a unique independent hardware computing domain, the method comprising:
receiving, by the digital display data compositor, a plurality of digital display data via a plurality of digital data input interfaces, each interface coupled to a single different independent hardware computing domain;
continuously identifying predetermined updatable regions of the digital display data for each independent hardware computing domain corresponding to graphical elements of the respective domain graphical user interface, each predetermined updateable region comprising a window, the windows having a user changeable layering order and each window having a user changeable size and position, by identifying an in-band signal within pixel values of the digital data received from each independent hardware computing domain, and each respective in-band signal defines regions of the digital display data corresponding to graphical elements of the graphical user interface from the respective independent hardware computing domain, and each respective in-band signal identifies a layering order of the graphical elements of the graphical user interface for each of the respective independent hardware computing domains;
associating a predetermined display characteristic with each identified region according to a predetermined security policy;
defining an overall user changeable layering order on the identified regions and associated graphical elements and display characteristics from all the independent hardware computing domains, wherein the overall user changeable layering order determines an active window;
compositing, according to the defined overall user changeable layering order, the identified regions and associated graphical elements and display characteristics from each of the independent hardware computing domains into a single digital display data stream, wherein the identified regions and associated graphical elements and display characteristics from each independent hardware computing domain are visually combined in an overlapping manner representing a single unified graphical user interface across all independent hardware computing domains;
displaying, in a predetermined region of the single unified graphical interface, the predetermined display characteristic corresponding to the active window, and
outputting, using a digital display output interface, the composited digital display data stream on the digital data display.

22. The method as claimed in claim 21, further comprising associating an output display characteristic with the composited digital display data set.

23. The method as claimed in claim 22, further comprising:
receiving peripheral device data input indicating use of a peripheral by a user via a peripheral interface;
switching the peripheral input to one of a plurality of domain peripheral interfaces according to a predetermined security policy, wherein each of the plurality of domain peripheral interfaces is for transmitting the peripheral device input data to the independent computing domains and each of the plurality of domain peripheral interfaces is configured to connect to at most one unique independent computing domain.

24. The method as claimed in claim 23, further comprising:
identifying which of the at least one peripheral interface is associated with one of the independent computing domains and designating this domain as the active domain; and
generating a domain banner that cannot be modified by any of the independent computing domains that at least indicates which of the independent computing domains is the active domain.

25. The method as claimed in claim 19, comprising:
providing a plurality of viewable user input regions, each associated with one of the independent; and
switching the active domain to the domain associated with the actuated user input region in response to actuation of respective user input regions.

26. The method as claimed in claim 21, wherein all regions associated with each independent computing domain share the same predetermined display characteristic.

27. The method of claim 26, wherein the predetermined display characteristic comprises a coloured border around the region.

28. The method of claim 21, wherein identifying predetermined regions of the digital display data for each independent computing domain further comprises:
identifying an in band signal in a digital data stream from each independent computing domain, and each respective in-band signal defines each region of the respective independent computing domain.

29. The method of claim 28, wherein each digital data stream from each independent computing domain comprises a reserved portion which comprises the in-band signal and in which all predetermined regions are excluded, and the reserved portion for each independent computing domain occupies an identical region in the composited digital display data.

30. The method of claim 29, further comprising indicating in the domain banner which of the independent computing domains is the currently active domain and wherein domain banner is a region that cannot be modified by any of the independent computing domains.

31. The method of claim 29, further comprising:
processing the in-band portion to determine cursor information comprising at least a shape for the respective independent computing domain, rendering an on-screen display cursor based on the cursor information for the respective domain.

32. The method of claim 21, wherein all regions associated with the same independent computing domain share the same order.

33. The method as claimed in claim 21, further comprising the steps:
capturing in a first domain information representing a user's request to cut, or copy some information from the first domain;
sending the captured information in-band within the stream of display data from the first domain;

processing the in-band portion to determine the captured information, storing the captured information, and applying a security policy to the captured information;

capturing a user's request to paste information into a second domain;

sending the captured information in-band within the stream of display data from the second domain; processing the in-band portion to determine the captured information;

recognizing the information from the second domain;

forwarding the stored and processed information received from the first domain to the second domain using the peripheral device data input to the second domain; and posting the stored and processed information received from the first domain to the second domain and the stream of display data from the second domain for display.

34. A secure digital display data compositor apparatus for simultaneous display of streams of different classes of display data on a digital data display, each stream corresponding to a graphical user interface for a unique independent hardware computing domain, comprising:

a plurality of digital display data input interfaces for receiving digital display data, each interface coupled to a digital display data output interface from a single different independent hardware computing domain;

a digital display data compositor, that is configured to:

continuously identify predetermined updatable regions of the digital display data for each independent hardware computing domain corresponding to graphical elements of the respective domain graphical user interface, each predetermined updateable region comprising a window, the windows having a layering order and each window having a user changeable size and position, by identifying an in-band signal within the pixel values of digital display data received from each independent hardware computing domain, and each respective in-band signal defines regions of the digital display data corresponding to graphical elements of the graphical user interface from the respective independent hardware computing domain, and each respective in-band signal identifies a layering order of the graphical elements of the graphical user interface for each of the respective independent hardware computing domains;

associate a predetermined display characteristic with each identified region according to a predetermined security policy;

define an overall user changeable layering order on the identified regions and associated graphical elements and display characteristics from all the independent hardware computing domains, wherein the overall user changeable layering order determines an active window;

composite, according to the overall user changeable layering order, the identified regions and associated graphical elements and display characteristics from each of the independent hardware computing domains into a single digital display data stream, wherein the identified regions and associated graphical elements and display characteristics from each independent domain are visually combined in an overlapping manner representing a single, unified graphical user interface across all independent hardware computing domains;

wherein the predetermined characteristic corresponding to the active window is displayed in a predetermined region of the single unified graphical interface;

a digital display output interface for outputting the composited digital display data stream on the digital data display; and at least one peripheral input interface for receiving peripheral device data input indicating use of a peripheral by a user;

a plurality of peripheral output interfaces for transmitting the received peripheral device input data to the independent computing domains, each of which configured to connect to at most one unique independent computing domain, and a switching component for directing peripheral input data received by the at least one peripheral input interface that receives peripheral device data, to the peripheral output interfaces for transmitting peripheral device input data according to the predetermined security policy that enables user interaction with each composited region and associated graphical element from each independent computing domain as part of a unified graphical user interface.

* * * * *